(12) United States Patent
Yutani et al.

(10) Patent No.: US 11,630,365 B2
(45) Date of Patent: Apr. 18, 2023

(54) ELECTROCHROMIC ELEMENT AND PRODUCTION METHOD THEREOF, ELECTROCHROMIC LIGHT-ADJUSTING ELEMENT, ELECTROCHROMIC LIGHT-ADJUSTING LENS, AND ELECTROCHROMIC DEVICE

(71) Applicant: RICOH COMPANY, LTD., Tokyo (JP)

(72) Inventors: Keiichiroh Yutani, Kanagawa (JP); Fuminari Kaneko, Kanagawa (JP); Yuto Matsuoka, Tokyo (JP); Kayato Ohya, Kanagawa (JP); Tohru Yashiro, Kanagawa (JP); Tomoo Fukuda, Tokyo (JP); Takashi Tsutsui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 160 days.

(21) Appl. No.: 17/105,888

(22) Filed: Nov. 27, 2020

(65) Prior Publication Data
US 2021/0165296 A1     Jun. 3, 2021

(30) Foreign Application Priority Data

Nov. 29, 2019  (JP) .............................. JP2019-217187
Mar. 31, 2020  (JP) .............................. JP2020-064004

(51) Int. Cl.
*G02F 1/1523* (2019.01)
*G02C 7/10* (2006.01)
(Continued)

(52) U.S. Cl.
CPC ........... *G02F 1/1525* (2013.01); *G02C 7/101* (2013.01); *G02F 2001/1536* (2013.01); *G02F 2001/164* (2019.01)

(58) Field of Classification Search
CPC ........... G02F 1/1525; G02F 2001/1536; G02F 2001/164; G02C 7/101
See application file for complete search history.

(56) References Cited

U.S. PATENT DOCUMENTS 5,184,239 A    2/1993  Sano et al.
5,763,050 A *  6/1998  Hirmer ..................... B60J 7/00
                                                296/210
(Continued)

FOREIGN PATENT DOCUMENTS

JP     07-175090     7/1995
JP     2005-514647   5/2005
JP     2018-010106   1/2018

OTHER PUBLICATIONS

Encyclopedia Britannica "polyethylene terephthalate" (Year: 2020).*
(Continued)

*Primary Examiner* — George G. King
(74) *Attorney, Agent, or Firm* — Xsensus LLP

(57) ABSTRACT

An electrochromic element including: a laminated body including a support formed of a resin, a first electrode layer, an electrochromic layer, and a second electrode layer, the support, the first electrode layer, the electrochromic layer, and the second electrode layer being disposed in the laminated body in this order; and a gel electrolyte disposed between the first electrode layer and the second electrode layer, wherein a phase separation temperature of the gel electrolyte is higher than a softening point of the support.

16 Claims, 8 Drawing Sheets

(51) Int. Cl.
*G02F 1/153* (2006.01)
*G02F 1/15* (2019.01)

(56) References Cited

U.S. PATENT DOCUMENTS

| | | |
|---|---|---|
| 8,384,983 B2 | 2/2013 | Yashiro et al. |
| 8,531,754 B2 | 9/2013 | Fujimura et al. |
| 8,593,715 B2 | 11/2013 | Yashiro et al. |
| 8,687,262 B2 | 4/2014 | Yashiro et al. |
| 8,736,941 B2 | 5/2014 | Naijo et al. |
| 8,902,151 B2 | 12/2014 | Yashiro et al. |
| 8,937,758 B2 | 1/2015 | Kim et al. |
| 9,041,997 B2 | 5/2015 | Takahashi et al. |
| 9,069,222 B2 | 6/2015 | Naijo et al. |
| 9,304,368 B2 | 4/2016 | Yashiro et al. |
| 9,389,480 B2 | 7/2016 | Naijo et al. |
| 9,500,926 B2 | 11/2016 | Fujimura et al. |
| 9,632,385 B2 | 4/2017 | Okada et al. |
| 9,688,706 B2 | 6/2017 | Inoue et al. |
| 9,829,762 B2 | 11/2017 | Takahashi et al. |
| 9,891,497 B2 | 2/2018 | Yashiro et al. |
| 9,932,522 B2 | 4/2018 | Goto et al. |
| 10,012,885 B2 | 7/2018 | Okada et al. |
| 10,054,834 B2 | 8/2018 | Shinoda et al. |
| 10,093,693 B2 | 10/2018 | Sagisaka et al. |
| 10,126,623 B2 | 11/2018 | Goto et al. |
| 10,281,793 B2 | 5/2019 | Ohshima et al. |
| 10,495,937 B2 | 12/2019 | Yashiro et al. |
| 10,527,905 B2 | 1/2020 | Kaneko et al. |
| 10,534,236 B2 | 1/2020 | Yamamoto et al. |
| 10,634,970 B2 | 4/2020 | Goto et al. |
| 2003/0165686 A1 | 9/2003 | Blackburn et al. |
| 2006/0203322 A1* | 9/2006 | Radmard .............. G02F 1/1525 |
| | | 359/265 |
| 2009/0103036 A1 | 4/2009 | Onodera et al. |
| 2009/0231663 A1 | 9/2009 | Hirano et al. |
| 2009/0256157 A1 | 10/2009 | Kondo et al. |
| 2009/0262411 A1 | 10/2009 | Karmhag et al. |
| 2010/0193775 A1 | 8/2010 | Yutani et al. |
| 2012/0050838 A1 | 3/2012 | Hirano et al. |
| 2015/0168796 A1 | 6/2015 | Yashiro et al. |
| 2015/0309383 A1* | 10/2015 | Taya .................... G02F 1/1525 |
| | | 359/275 |
| 2016/0005375 A1 | 1/2016 | Naijo et al. |
| 2016/0209721 A1 | 7/2016 | Matsumoto et al. |
| 2017/0235203 A1 | 8/2017 | Yamamoto et al. |
| 2017/0329198 A1 | 11/2017 | Matsuoka et al. |
| 2017/0329199 A1 | 11/2017 | Yashiro et al. |
| 2018/0017835 A1 | 1/2018 | Kim et al. |
| 2018/0044581 A1 | 2/2018 | Sagisaka et al. |
| 2018/0231857 A1 | 8/2018 | Kim et al. |
| 2019/0031694 A1 | 1/2019 | Sagisaka et al. |
| 2019/0184694 A1 | 6/2019 | Yashiro et al. |
| 2019/0227401 A1 | 7/2019 | Yutani et al. |
| 2019/0271893 A1* | 9/2019 | Wang .................... G02F 1/155 |
| 2019/0285960 A1 | 9/2019 | Sasa et al. |
| 2019/0310530 A1 | 10/2019 | Kaneko et al. |
| 2019/0324338 A1 | 10/2019 | Takauji et al. |
| 2020/0089070 A1 | 3/2020 | Yamamoto et al. |
| 2020/0103718 A1 | 4/2020 | Okada et al. |
| 2020/0216478 A1 | 7/2020 | Sagisaka et al. |
| 2020/0301226 A1 | 9/2020 | Yashiro et al. |
| 2020/0301227 A1 | 9/2020 | Takahashi et al. |

OTHER PUBLICATIONS

Extended European Search Report dated May 14, 2021, issued in corresponding EP Application No. 20210482.4, 13 pages.

* cited by examiner

ELECTROCHROMIC ELEMENT AND PRODUCTION METHOD THEREOF, ELECTROCHROMIC LIGHT-ADJUSTING ELEMENT, ELECTROCHROMIC LIGHT-ADJUSTING LENS, AND ELECTROCHROMIC DEVICE

CROSS-REFERENCE TO RELATED APPLICATIONS

The present application claims priority under 35 U.S.C. § 119 to Japanese Patent Application No. 2019-217187 filed Nov. 29, 2019, and Japanese Patent Application No. 2020-064004 filed Mar. 31, 2020. The contents of which are incorporated herein by reference in their entirety.

BACKGROUND OF THE INVENTION

Field of the Invention

The present disclosure relates to an electrochromic element, a method for producing the electrochromic element, an electrochromic light-adjusting element, an electrochromic light-adjusting lens, and an electrochromic device.

Description of the Related Art

Electrochromism is a phenomenon where a redox reaction reversely occurs by application of voltage to reversibly change a color. An element utilizing the electrochromism is an electrochromic element. The electrochromic element has characteristics that high transparency is achieved, and high coloring density can be achieved once the electrochromic element is colored. Therefore, application of the electrochromic element as a light-adjusting element is expected.

Moreover, a film-like electrochromic element can be produced by using a resin substrate as a base material. Such an electrochromic element can produce an electrochromic element that can be bent or can have a three-dimensional shape.

One example of a field in which application of the aforementioned electrochromic element is particularly expected is a light-adjusting lens for spectacles. The conventional light-adjusting lenses are generally photochromic lenses that develop colors through ultraviolet rays (for example, see Japanese Translation of PCT International Application Publication No. JP-T-2005-514647). However, because color changes by light, there were problems that a user cannot adjust color, automobiles that block ultraviolet rays have a decreased effect of coloring, and the response time is long.

When a light-adjusting lens to which an electrochromic element is applied can be achieved, these problems are considered to be overcome. Therefore, many researches and developments have been performed so far. For example, a spectacle lens on which an electrochromic element is directly formed has been proposed (see, for example, Japanese Unexamined Patent Application Publication No. 07-175090).

A problem to apply an electrochromic element to a lens for spectacles is productivity. The lens for spectacles has the following problems. Specifically, adjustment of a film formation process is required because the lens for spectacles is different in a curved surface shape of the lens depending on strength required by a wearer, which makes stable production difficult. Moreover, when an electrochromic element is directly formed on an optical lens, it is necessary to repeatedly subject an expensive lens as a substrate to the vacuum film formation or the wet coating several times, resulting in high cost at the time of occurrence of defects.

An electrochromic element, which has a desired curved surface obtained by subjecting a plane-shaped electrochromic element to thermoforming and has an optical lens on one surface of the electrochromic element, has been proposed (see, for example, Japanese Unexamined Patent Application Publication No. 2018-10106). An electrochromic element suitable for such a process can be produced in the following manner. Specifically, a resin substrate is used as a support. After an electrochromic material is formed between two electrodes facing each other, and they are pasted with each other via an electrolyte layer that can conduct ions, to form the electrochromic element. Then, the electrochromic element is inserted between a concave mold and a convex mold that are heated to a temperature near the softening point or the glass transition temperature of the resin substrate, and is subjected to thermoforming, which makes it possible to process electrochromic element so as to have a curved surface shape or a three-dimensional shape. As a method for forming a lens, a method where an electrochromic element is embedded in a melted resin for a lens, followed by curing, and a method where an electrochromic element is directly pasted on a lens are proposed. According to the methods, it is possible to achieve production of a wide variety of lenses having a high degree of freedom in size at low cost in a small-lot production.

SUMMARY OF THE INVENTION

According to one aspect of the present disclosure, an electrochromic element includes: a laminated body including a support formed of a resin, a first electrode layer, an electrochromic layer, and a second electrode layer, the support, the first electrode layer, the electrochromic layer, and the second electrode layer being disposed in the laminated body in this order; and a gel electrolyte disposed between the first electrode layer and the second electrode layer. A phase separation temperature of the gel electrolyte is higher than a softening point of the support.

DESCRIPTION OF THE EMBODIMENTS (Electrochromic Element)

Figure 1A:
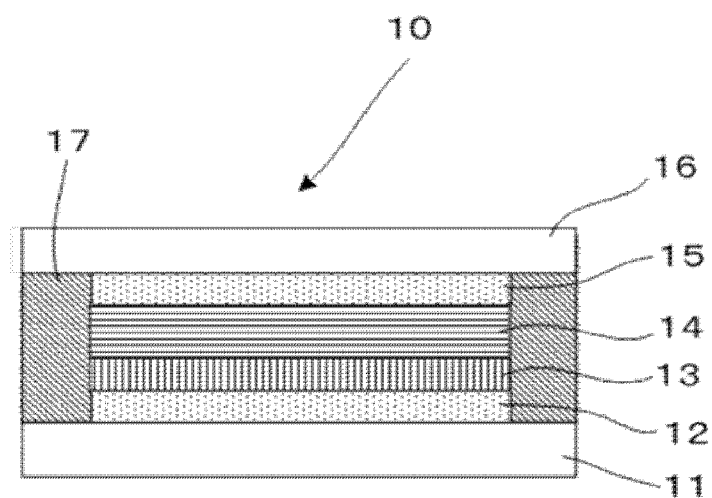
FIG. 1A is a schematic cross-sectional view illustrating an example of an electrochromic element obtained before thermoforming according to a first embodiment.

An electrochromic element of the present disclosure includes: a laminated body including a support formed of a resin, a first electrode layer, an electrochromic layer, and a second electrode layer, the support, the first electrode layer, the electrochromic layer, and the second electrode layer being disposed in the laminated body in this order; and a gel electrolyte disposed between the first electrode layer and the second electrode layer. A phase separation temperature of the gel electrolyte is higher than a softening point of the support. The electrochromic element may further include other layers according to the necessity.

The present disclosure has an object to provide an electrochromic element that can prevent phase separation of a gel electrolyte caused by thermoforming.

The present disclosure can provide an electrochromic element that can prevent phase separation of a gel electrolyte caused by thermoforming.

The conventional techniques have the following problems. Specifically, an electrolyte layer used in an electrochromic element has poor heat resistance. When heat of a temperature equal to or higher than a certain temperature is applied thereto, phase separation of a liquid component and a solid component in the electrolyte layer occurs, which deteriorates reliability of a device. In addition, occurrence of optical distortion and exfoliation deteriorates optical quality. Moreover, in order to form a desired curved surface shape through thermoforming, a temperature near a softening point of a resin substrate or a temperature higher than the softening temperature is applied, thus-caused problems may significantly occur. The present disclosure is based on these findings.

In the present disclosure, the softening point of the support means a temperature at which a resin constituting the support starts to deform.

The softening point of the support can be determined in the following manner. Specifically, heat is applied to a support with a penetration probe using a TMA (thermomechanical analysis) device (available from KOBELCO Research Institute), and a displacement amount of a resin constituting the support is measured to determine the softening point.

In the present disclosure, the phase separation temperature of the gel electrolyte means a temperature at which the gel electrolyte is separated into a matrix polymer and a liquid. In the present disclosure, a gel electrolyte is particularly formed, and a state that a liquid floats on the surface of the gel electrolyte layer at the time of heating is observed, and its temperature is regarded as a "phase separation temperature". When heating is performed at a temperature exceeding the phase separation temperature of the gel electrolyte of the electrochromic element, the liquid in the element flows actively. Therefore, adhesion at an interface between the gel electrolyte and the electrochromic layer, adhesion at an interface between the gel electrolyte and the electrode, or adhesion at an interface between the gel electrolyte and the protective layer is decreased, which may cause problems such as occurrence of optical distortion and exfoliation. These problems may occur significantly when the electrochromic element is heated at a temperature near the softening point of a resin substrate or a temperature higher than the softening temperature. Therefore, increasing the phase separation temperature of the gel electrolyte prevents these problems and can enhance the reliability of an element.

The phase separation temperature of the gel electrolyte is measured in the following manner. Specifically, a gel electrolyte layer is placed on a hot plate and is heated. At that time, the film surface is visually observed, and a temperature at the time when a liquid is generated on the surface of the gel electrolyte layer is measured, which is regarded as the phase separation temperature.

According to an embodiment of the present disclosure, the laminated body preferably has a desired curved surface shape formed by thermoforming.

As the thermoforming, such a method that a laminated body is heated and molded using a convex mold and a concave mold having a desired 3D shape without fixing ends of a support. Moreover, the thermoforming and vacuum forming may be performed in combination.

The "desired curved surface shape" is a shape formed of a curved surface having a curvature. Examples of the desired curved surface shape include spherical shapes, cylindrical shapes, cone shapes, and various three-dimensional (3D) shapes. Note that, at least part of the laminated body may include the "desired curved surface shape", or the whole laminated body may include the "desired curved surface shape".

In the thermoforming step, heating is preferably performed at a temperature near a softening point of a material constituting the support or at a temperature higher than the softening temperature. At this time, it was found that the problems of the phase separation of the gel electrolyte in the thermoforming step can be solved when a phase separation temperature of a gel electrolyte is higher than a softening point of the material of the support.

According to an embodiment of the present disclosure, the gel electrolyte preferably includes a binder resin that will be described later, and the binder resin preferably includes a urethane resin unit. When the binder resin includes a urethane resin unit, a phase separation temperature of the gel electrolyte can be significantly increased. Moreover, physical properties required for the gel electrolyte, such as improvement of strength of a film, can be achieved.

According to an embodiment of the present disclosure, the gel electrolyte preferably includes a binder resin that will be described later, and the binder resin preferably includes at least one selected from the group consisting of a polyethylene oxide (PEO) chain and a polymethyl methacrylate (PMMA) chain. This makes it possible to enhance affinity with an electrolyte that is a liquid and to increase the phase separation temperature. Moreover, the phase separation temperature can be increased by using the urethane resin unit in combination.

According to an embodiment of the present disclosure, a solid content of the gel electrolyte is preferably 50% by mass or less, and more preferably 40% by mass or less. When the solid content of the gel electrolyte is 50% or less, ion conductivity can be sufficiently increased, and thus response time of a resulting electrochromic element can be shortened. The lower limit of the solid content of the gel electrolyte is about 10% by mass in terms of a phase separation temperature of the gel electrolyte.

According to an embodiment of the present disclosure, the gel electrolyte preferably includes an ionic liquid. Because the ionic liquid is a material that is stable in a wide temperature range and is nonvolatile and chemically stable, reliability of the resulting electrochromic element can be improved. Moreover, a thermally stable gel electrolyte having a high phase separation temperature can be obtained by mixing the ionic liquid with the urethane resin unit. Moreover, a thermally stable gel electrolyte having a high phase separation temperature can be obtained by mixing the ionic liquid with a resin including a polyethylene oxide (PEO) chain or a polymethyl methacrylate (PMMA) chain.

A phase separation temperature of the gel electrolyte is preferably 160° C. or higher, and more preferably 200° C. or higher. When the phase separation temperature of the gel electrolyte is 160° C. or higher, the temperature at the time of thermoforming can become higher. Therefore, a degree of freedom in selecting the material of the base material can be increased. The upper limit of the phase separation temperature of the gel electrolyte is about 250° C. in terms of heat resistance of, for example, the electrochromic layer.

A softening point of the support is preferably 200° C. or lower, and more preferably 160° C. or lower. This makes it possible to prevent deterioration of the electrochromic material or the gel electrolyte binder contained in the electrochromic element by application of heat. The lower limit of the softening point of the support is about 100° C. in terms of stability on practical use, including stability in a storage environment.

A difference between the phase separation temperature of the gel electrolyte and the softening point of the support is preferably 10° C. or higher, and more preferably 20° C. or higher. When the difference between the phase separation temperature of the gel electrolyte and the softening point of the support is 50° C. or higher, high reproducibility by a mold can be achieved through thermoforming. The upper limit of the difference between the phase separation temperature of the gel electrolyte and the softening point of the support is about 80° C. in terms of freedom in selecting a material of the support and prevention of deterioration of the electrochromic material.

In the electrochromic element, the support is preferably a support formed of a resin. When a laminated body where each layer is formed on the resin substrate having a plane shape is subjected to thermoforming, a desired curved surface shape is formed. Therefore, it is possible to provide an electrochromic element excellent in productivity of formation of a coating film.

Moreover, the support preferably includes at least one selected from the group consisting of a polycarbonate resin, a polyethylene terephthalate resin, a polymethyl methacrylate resin, a urethane resin, a polyolefin resin, and a polyvinyl alcohol resin. Among them, a polycarbonate resin, a polyethylene terephthalate resin, and a polymethyl methacrylate resin are preferable in terms of moldability and film formability of a coating film.

In the case where the gel electrolyte is formed into a layered gel electrolyte layer, a thickness of the gel electrolyte layer is preferably 30 μm or more but 150 μm or less. When a thickness of the gel electrolyte layer falls within the range, it is difficult to decrease optical quality due to film thickness nonuniformity at time when the gel electrolyte layer is cured and shrunk, and it is difficult to cause such a problem that the cost of materials of the gel electrolyte layer becomes high. In addition, short circuit between electrodes of the electrochromic element hardly occurs, which improves reliability.

In the present disclosure, an optical lens is preferably disposed on at least one surface of the laminated body. This makes it possible to provide an electrochromic element that has a strong mechanical strength and a desired curved surface shape through thermoforming, and is suitable for optical applications such as lenses.

The optical lens may be formed on one surface of the laminated body, or may be formed so as to embed the laminated body.

The optical lens preferably includes at least one transparent material selected from the group consisting of a polycarbonate resin, an allyl diglycol carbonate resin, a diallyl carbonate resin, a diallyl phthalate-based resin, a urethane resin, a thiourethane resin, an episulfide resin, a (meth)acrylate resin, and a cycloolefin resin. Among them, a polycarbonate resin, a thiourethane resin, and an allyl diglycol carbonate resin are preferable in terms of mechanical strength.

An optical lens can be adhesively formed by curing the transparent material again after melting so that it is in contact with one surface of the laminated body or by applying light or heat thereto. Moreover, the laminated body and the optical lens may be attached together via an adhesive layer.

A material of the adhesive layer is not particularly limited and may be appropriately selected depending on the intended purpose. Examples of the material of the adhesive layer include transparent materials such as epoxy resins, urethane-based resins, acryl-based resins, and vinyl acetate-based resins. Among them, acryl-based resins are preferable.

It is preferable that the support be disposed on the other surface of the laminated body in terms of scratch resistance.

The electrochromic element includes at least one support. The electrochromic element may have a structure including one support, or may have a structure including two supports.

When the electrochromic element includes one support, the cost of the members can be decreased.

(Method for Producing Electrochromic Element)

A method of the present disclosure for producing an electrochromic element is a method for producing the electrochromic element of the present disclosure. The method includes a step of subjecting the laminated body produced to thermoforming so as to have a desired curved surface shape; and a step of attaching an optical lens on the laminated body. The method further includes other steps if necessary.

The thermoforming is suitably a method where a laminated body is heated and molded using a convex mold and a concave mold having a desired 3D shape without fixing ends of the support.

A heating temperature in the thermoforming is preferably a temperature that is equal to or higher than a softening point of a material constituting the support. For example, when a polycarbonate resin as the support is used, the heating temperature is more preferably 130° C. or higher but 190° C. or lower.

In the step of attaching the optical lens on the laminated body, so that a transparent material of the optical lens is in contact with one surface of the laminated body, the transparent material is melted, followed by curing again, or light or heat is applied thereto for curing, which makes it possible to adhesively form the optical lens. The laminated body and the optical lens can be attached to each other via an adhesive layer.

In the method for producing the electrochromic element, the optical lens attached on the outer surface of the support preferably has a tentative strength and a tentative thickness. When the optical lens after attachment is subjected to cutting processing, a desired curved surface shape can be formed. Therefore, processing of a lens having a good precision (e.g., strength processing) according to users-specific conditions can be achieved. That is, it is not necessary to provide molds and members for each product shape, and it is easy to produce various kinds of products with high precision in a small lot production.

Here, the embodiments will be described with reference to the drawings. In each drawing, the same components may be given to the same reference numerals, and the redundant description may be omitted.

<Electrochromic Element of First Embodiment and its Production Method>

Figure 1B:
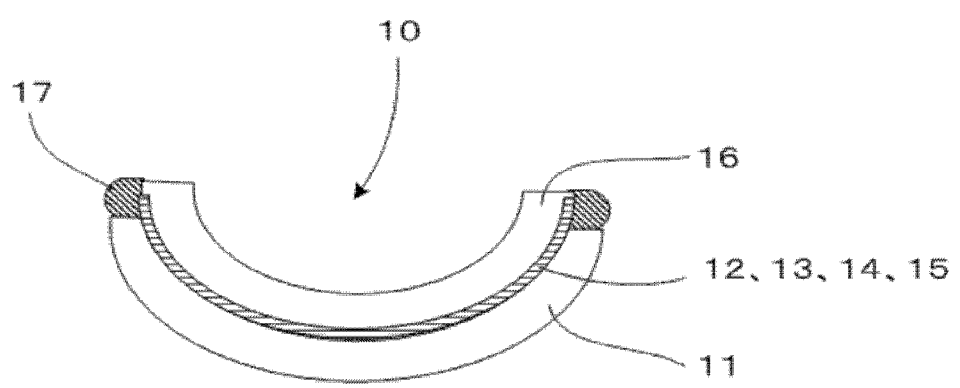
FIG. 1B is a schematic cross-sectional view illustrating an example of the electrochromic element obtained after thermoforming according to the first embodiment.
Figure 1C:
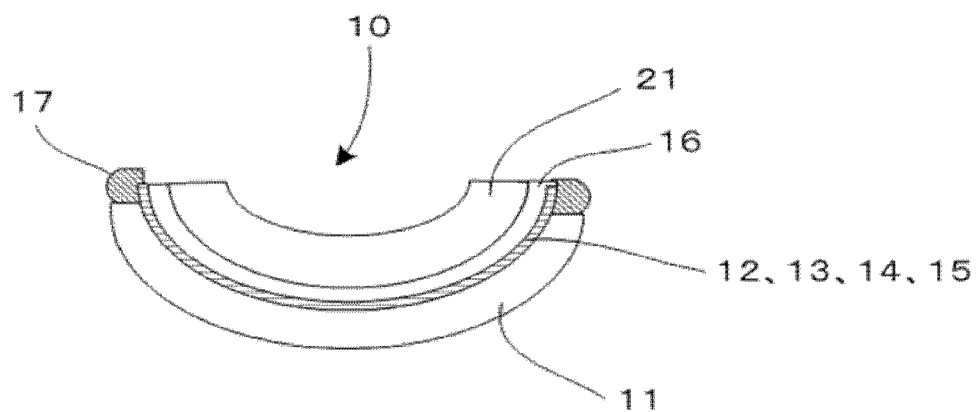
FIG. 1C is a schematic cross-sectional view illustrating an example of the electrochromic element obtained after an optical lens is attached to the electrochromic element according to the first embodiment.

FIG. 1A, FIG. 1B, and FIG. 1C are each a schematic cross-sectional view presenting one example of an electrochromic element 10 according to the first embodiment. FIG. 1A is a schematic cross-sectional view illustrating an example of an electrochromic element obtained before thermoforming. FIG. 1B is a schematic cross-sectional view illustrating an example of the electrochromic element obtained after thermoforming. FIG. 1C is a schematic cross-sectional view illustrating an example of the electrochromic element obtained after a lens is attached thereto. Referring to FIG. 1A, FIG. 1B, and FIG. 1C, the electrochromic element 10 includes a first support 11, a first electrode layer 12, an electrochromic layer 13, a gel electrolyte layer 14, a second electrode layer 15, a second support 16, and a protective layer 17. The first electrode layer 12 and the electrochromic layer 13 are laminated in this order on the first support 11. The second electrode layer 15 and the gel electrolyte layer 14, which is formed between the electrodes 12 and 15 facing each other, are laminated in this order on the second support 16. The protective layer 17 seals peripheral parts.

In the electrochromic element 10, the first electrode layer 12 is disposed on the first support 11, and the electrochromic layer 13 is disposed in contact with the first electrode layer 12. Above the electrochromic layer 13, the second electrode layer 15 is disposed via the gel electrolyte layer 14 so as to face the first electrode layer 12.

For the sake of convenience, in each of the first electrode layer 12 and the second electrode layer 15, surfaces facing each other are each referred to as "inner surface", and a surface opposite to each inner surface is referred to as "outer surface". In the present embodiment, the inner surface of the first electrode layer 12 is in contact with the electrochromic layer 13, and the outer surface of the first electrode layer 12 is in contact with the first support 11. The inner surface of the second electrode layer 15 is in contact with the gel electrolyte layer 14, and the outer surface of the second electrode layer 15 is in contact with the second support 16. The reference numeral 17 and the reference numeral 21 in FIG. 1A, FIG. 1B, and FIG. 1C are a protective layer and an optical lens, respectively.

A method for producing the electrochromic element 10 of the first embodiment includes: a step of laminating, on the first support 11, the first electrode layer 12 and the electrochromic layer 13 in this order; a step of forming the second electrode layer 15 on the second support 16; a step of forming the gel electrolyte layer 14 between the two supports, followed by curing, and sealing the peripheral parts with the protective layer 17; and a step of forming a curved surface shape through thermoforming. The method further includes other steps if necessary.

In addition, the method for producing electrochromic element 10 of the first embodiment includes: a step of laminating, on the first support 11, the first electrode layer 12 and the electrochromic layer 13 in this order; a step of forming the gel electrolyte layer 14 on the electrochromic layer 13, followed by curing, and laminating the second electrode layer 15; a step of forming, on the second electrode layer 15, the second support 16 formed of a curing resin; a step of sealing the peripheral parts with the protective layer 17; and a step of forming a curved surface shape through thermoforming. The method further includes other steps if necessary.

Note that, FIG. 1B presents a view where the support at a side of the electrochromic layer 13 is processed so as to have a convex spherical surface. However, it can be processed so as to have a concave spherical surface as well.

In the electrochromic element 10, when voltage is applied between the first electrode layer 12 and the second electrode layer 15, the electrochromic layer 13 gives and receives electric charges to cause oxidation-reduction reaction, resulting in coloring and decoloring.

As described above, in the electrochromic element according to the first embodiment, a curved surface having a desired 3D shape can be formed through thermoforming. Therefore, it is possible to provide an electrochromic element excellent in productivity (an increase in size).

Moreover, when the electrochromic element according to the first embodiment includes an organic electrochromic material, an electrochromic element excellent in coloring characteristics can be achieved.

Hereinafter, each component constituting the electrochromic element 10 according to the first embodiment will be described in detail.

[Support]

The first support 11 and the second support 16 each have a function of supporting the first electrode layer 12, the electrochromic layer 13, the gel electrolyte layer 14, the second electrode layer 15, and the protective layer 17.

As the first support 11 and the second support 16, a conventional resin material that can be subjected to thermoforming can be used as it is, so long as each of the layers can be supported.

As the first support 11 and the second support 16, for example, a resin substrate such as a polycarbonate resin, a polyethylene terephthalate resin, a polymethyl methacrylate resin, a urethane resin, a polyolefin resin, or a polyvinyl alcohol resin may be used.

When the electrochromic element 10 is a reflective display element that is visually recognized from a side of the second electrode layer 15, either the first support 11 or the second support 16 does not need to have transparency. Moreover, a transparent insulating layer and a reflection preventing layer may be coated on the surfaces of the first support 11 and the second support 16 in order to enhance the water vapor barrier property, the gas barrier property, and the visibility.

An average thickness of the first support 11 and an average thickness of the second support 16 are preferably 0.2 mm or more but 1.0 mm or less, because thermoforming is easily performed.

[First Electrode Layer and Second Electrode Layer]

A material of the first electrode layer 12 and a material of the second electrode layer 15 are suitably transparent conductive oxide materials. Examples thereof include tin-doped indium oxide (referred to as "ITO" hereinafter), fluorine-doped tin oxide (referred to as "FTO" hereinafter), and antimony-doped tin oxide (referred to as "ATO" hereinafter). Among them, preferable is an inorganic material including at least one selected from the group consisting of indium oxide (referred to as "In oxide" hereinafter), tin oxide (referred to as "Sn oxide" hereinafter), and zinc oxide (referred to as "Zn oxide" hereinafter), each of which is formed through vacuum vapor film formation.

The In oxide, the Sn oxide, and the Zn oxide are materials that can be easily formed into a film by the sputtering method and can achieve excellent transparency and electric conductivity. Among them, InSnO, GaZnO, SnO, $In_2O_3$, ZnO, and InZnO are particularly preferable. Moreover, the electrode layer having a lower crystallinity is more preferable. The reason for this is because a high crystallinity thereof may easily cause separation of the electrode layer through thermoforming. From this point of view, IZO and AZO, which are amorphous films and exhibit high conductivity, are preferable. When these materials of the electrode layer are used, thermoforming is preferably performed so that a ratio of a maximum major axis length of the support at a curved surface of the laminated body after thermoforming to a maximum major axis length of the support at a plane surface of the laminated before thermoforming is 120% or less, and thermoforming is more preferably performed so that the ratio is 103% or less.

In addition, conductive metal thin films that have transparency and include silver, gold, copper, or aluminum; carbon films such as carbon nanotube and graphene; network electrodes such as conductive metals, conductive carbons, and conductive oxides; and composite layers thereof are also useful. The network electrode is an electrode having a transmittance by forming, for example, carbon nanotube or another nontransparent material having a high conductivity in the form of a fine network. The network electrode is preferable because it is difficult to cut the network electrode at the time of thermoforming.

The electrode layer is more preferably a laminated layer configuration of the network electrode and the conductive oxide or a laminated layer configuration of the conductive metal thin film and the conductive oxide. The laminated layer configuration allows the electrochromic layer to color and decolor in a uniform manner. The conductive oxide layer can be formed by coating a nanoparticle ink. The laminated layer configuration of the conductive metal thin film and the conductive oxide is specifically an electrode that satisfies conductivity and transparency in a thin film laminated layer configuration of, for example, ITO/Ag/ITO.

A thickness of the first electrode layer 12 and a thickness of the second electrode layer 15 are adjusted so that an electrical resistance value required for the oxidation-reduction reaction of the electrochromic layer 13 can be obtained.

When a material of the first electrode layer 12 and the second electrode layer 15 is an ITO film produced under vacuum, each of the thickness of the first electrode layer 12 and the thickness of the second electrode layer 15 is preferably 20 nm or more but 500 nm or less, more preferably 50 nm or more but 200 nm or less.

When the conductive oxide layer is formed by coating a nanoparticle ink, a thickness of the conductive oxide layer is preferably 0.2 μm or more but 5 μm or less. A thickness of the network electrode is preferably 0.2 μm or more but 5 μm or less.

When it is used as a light-adjusting mirror, either the first electrode layer 12 or the second electrode layer 15 may have a reflection function. In this case, the material of the first electrode layer 12 and the second electrode layer 15 may include a metal material. Examples of the metal material include Pt, Ag, Au, Cr, rhodium, Al, alloys thereof, and laminated layer configurations thereof.

Examples of a method for producing each of the first electrode layer 12 and the second electrode layer 15 include the vacuum vapor deposition method, the sputtering method, and the ion plating method. Various printing methods such as the spin coating method, the casting method, the micro gravure coating method, the gravure coating method, the bar coating method, the roll coating method, the wire bar coating method, the dip coating method, the slit coating method, the capillary coating method, the spray coating method, the nozzle coating method, the gravure printing method, the screen printing method, the flexographic printing method, the offset printing method, the reverse printing method, and the inkjet printing method can be used so long as the material of the first electrode layer 12 and the material of the second electrode layer 15 can be each coated for formation.

[Electrochromic Layer]

The electrochromic layer 13 is a layer including an electrochromic material.

The electrochromic material may be an inorganic electrochromic compound or an organic electrochromic compound. Moreover, a conductive polymer known to exhibit electrochromism may be used as the electrochromic material.

Examples of the inorganic electrochromic compound include tungsten oxide, molybdenum oxide, iridium oxide, and titanium oxide.

Examples of the organic electrochromic compound include viologen, rare-earth phthalocyanine, and styryl.

Examples of the conductive polymer include polypyrrole, polythiophene, polyaniline, and derivatives thereof.

The electrochromic layer 13 preferably has a structure where an organic electrochromic compound is born on conductive or semiconductive particles. The aforementioned structure is a structure obtained in the following manner. Specifically, particles having a particle diameter of 5 nm or more but 50 nm or less are bound on the surface of the electrode layer, and an organic electrochromic compound having a polar group such as a carboxyl group, a silanol group, or phosphonic acid is adsorbed on the surfaces of the particles.

The aforementioned structure enables a high-speed response compared to conventional electrochromic display elements because the large surface effect of the particles is used to efficiently inject electrons into the organic electrochromic compound. Moreover, because a transparent film as a display layer can be formed by using the particles, a high coloring density of the electrochromic compound can be obtained. A plurality kinds of organic electrochromic compounds can be born on the conductive or semiconductive particles. The conductive particles can function as conductivity of the electrode layer.

Specific examples of polymer-based electrochromic compounds and dye-based electrochromic compounds include: low-molecular organic electrochromic compounds such as azobenzene-based compounds, anthraquinone-based compounds, diarylethene-based compounds, dihydropyrene-based compounds, dipyridine-based compounds, styryl-based compounds, styryl spiropyran-based compounds, spirooxazine-based compounds, spirothiopyran-based compounds, thioindigo-based compounds, tetrathiafulvalene-based compounds, terephthalic acid-based compounds, triphenylmethane-based compounds, benzidine-based compounds, triphenylamine-based compounds, naphthopyran-based compounds, viologen-based compounds, pyrazoline-based compounds, phenazine-based compounds, phenylenediamine-based compounds, phenoxazine-based compounds, phenothiazine-based compounds, phthalocyanine-based compounds, fluoran-based compounds, fulgide-based compounds, benzopyran-based compounds, and metallocene-based compounds; and high-molecular conductive compounds such as polyaniline and polythiophene. These may be used alone or in combination.

Among them, viologen-based compounds and dipyridine-based compounds are preferable, and dipyridine-based compounds represented by the following General Formula (1) are more preferable because a coloring-decoloring potential is low and excellent color values are obtained.

[General Formula (1)]

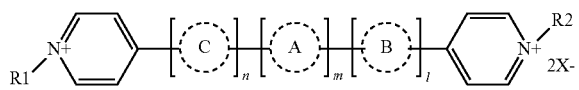

In General Formula (1), R1 and R2 are each independently an alkyl group containing from 1 through 8 carbon atoms that may have a substituent, or an aryl group that may have a substituent, and at least one of R1 and R2 has a substituent selected from the group consisting of COOH, $PO(OH)_2$, and $Si(OC_kH_{2k+1})_3$ (with the proviso that k is from 1 through 20).

In General Formula (1), X is a monovalent anion. The monovalent anion is not particularly limited and may be appropriately selected depending on the intended purpose, as long as the monovalent anion stably form a pair with a cation site. Examples thereof include Br ion ($Br^-$), Cl ion ($Cl^-$), $ClO_4$ ion ($ClO_4^-$), $PF_6$ ion ($PF_6^-$), and $BF_4$ ion ($BF_4^-$). In the General Formula (1), n, m, and l each independently represent 0, 1, or 2.

In the General Formula (1), A, B, and C each independently represent an alkyl group containing from 1 through 20 carbon atoms that may have a substituent, an aryl group that may have a substituent, or a heterocyclic group that may have a substituent.

As the metal complex-based or metal oxide-based electrochromic compound, an inorganic electrochromic compound, such as titanium oxide, vanadium oxide, tungsten oxide, indium oxide, iridium oxide, nickel oxide, and Persian blue, can be used.

The conductive or semiconductive particles that bear the electrochromic compound are not particularly limited and may be appropriately selected depending on the intended purpose. A metal oxide is preferably used.

Examples of a material of the metal oxide include metal oxides each including, as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, or aluminosilicate. These may be used alone or in combination.

Among them, at least one selected from the group consisting of titanium oxide, zinc oxide, tin oxide, zirconium oxide, iron oxide, magnesium oxide, indium oxide, and tungsten oxide is preferable in terms of electrical characteristics such as electrical conductivity and physical characteristics such as optical properties, and titanium oxide or tin oxide is particularly preferable because a color display that is more excellent in a response speed of coloring and decoloring can be achieved.

Shapes of the conductive or semiconductive particles are not particularly limited and may be appropriately selected depending on the intended purpose. In order to efficiently bear the electrochromic compound, shapes of the conductive or semiconductive particles having a large surface area per unit volume (referred to as "specific surface area" hereinafter) are used. In the case where the particles are aggregates of nanoparticles, for example, the particles have a large specific surface area, and therefore the electrochromic compound is more efficiently born on the particles and a display contrast ratio of coloring and decoloring is excellent.

The electrochromic layer 13 and the conductive or semiconductive particle layer can be formed through the vacuum film formation but are preferably formed by coating a particle dispersion paste in terms of productivity.

An average thickness of the electrochromic layer 13 is not particularly limited and may be appropriately selected depending on the intended purpose. The average thickness thereof is preferably 0.2 μm or more but 5.0 μm or less. When the average thickness is 0.2 μm or more but 5.0 μm or less, an excellent coloring density can be obtained, and a decrease in the visibility due to coloring cannot be found, which is favorable.

[Gel Electrolyte Layer]

The gel electrolyte layer includes a binder resin and an electrolyte.

The binder resin is not particularly limited and may be appropriately selected depending on the intended purpose. The binder resin preferably includes a urethane resin unit in terms of a phase separation temperature of the polymerized film and the film strength. Inclusion of a polyethylene oxide (PEO) chain can improve compatibility with the electrolyte and can increase the phase separation temperature. In addition, inclusion of a polymethyl methacrylate (PMMA) chain can improve compatibility with the electrolyte and can increase the phase separation temperature, similarly to the inclusion of the PEO chain.

The gel electrolyte layer is not particularly limited and may be appropriately selected depending on the intended purpose. Examples of the gel electrolyte include: a liquid electrolyte such as an ionic liquid; and a solution obtained by dissolving a solid electrolyte in a solvent.

The ionic liquid is not particularly limited and may be appropriately selected depending on the intended purpose. Examples of the ionic liquid include those in a liquid state near a temperature at which the ionic liquid is to be used. Note that, the ionic liquid means a liquid that dissolves a salt and exhibits a liquid state at normal temperature.

The ionic liquid includes a cation and an anion.

Examples of the cation include cations derived from: imidazole derivatives such as N,N-dimethylimidazole salts, N,N-methylethylimidazole salts, N,N-methylpropylimidazole salts, N,N-methylbutylimidazole salts, and N,N-allylbutylimidazole salts; pyridinium derivatives such as N,N-dimethylpyridinium salts and N,N-methylpropylpyridinium salts; pyrrolidinium derivatives such as N,N-dimethylpyrrolidinium salts, N-ethyl-N-methylpyrrolidinium salts, N-methyl-N-propylpyrrolidinium salts, N-butyl-N-methylpyrrolidinium salts, N-methyl-N-pentylpyrrolidinium salts, and N-hexyl-N-methylpyrrolidinium salts; and aliphatic quaternary ammonium-based salts such as trimethylpropylammonium salts, trimethyl hexyl ammonium salts, and triethyl hexyl ammonium salts. These may be used alone or in combination.

Examples of the anion include a chlorine anion, a bromine anion, an iodine anion, $BF_4^-$, $BF_3CF_3^-$, $BF_3C_2F_5^-$, $PF_6^-$, $NO_3^-$, $CF_3CO_2^-$, $CF_3SO_3^-$, $(CF_3SO_2)_2N^-$, $(FSO_2)_2N^-$, $(CF_3SO_2)(FSO_2)N^-$, $(CN)_2N^-$, $(CN)_3C^-$, $(CN)_4B^-$, $(CF_3SO_2)_3C^-$, $(C_2F_5SO_2)_2N^-$, $(C_2F_5)_3PF_3^-$, $AlCl_4^-$, and $Al_2Cl_7^-$. These may be used alone or in combination.

Examples of the ionic liquid include liquids obtained by dissolving, for example, ethyl methylimidazolium tetracyanoborate (EMIMTCB, available from Merck), ethyl methylimidazolium bistrifluoromethane sulfonamide (EMIMTFSI, available from KANTO CHEMICAL CO., INC.), ethyl methylimidazolium trip entafluoroethyl trifluorophosphate (EMIMFAP, available from Merck), allyl butyl imidazolium tetrafluoroborate (ABIMBF4, available from KANTO CHEMICAL CO., INC.), and methylpropylpyrrolidinium bisfluorosulfonimide (P13FSI, available from KANTO CHEMICAL CO., INC.). These may be used alone or in combination.

An amount of the ionic liquid is preferably 50% by mass or more, and particularly preferably 80% by mass or more, relative to a total amount of the gel electrolyte layer. When the amount of the ionic liquid is 50% by mass or more, ion conductivity can be improved.

As a material of the solid electrolyte, for example, supporting electrolytes of inorganic ion salts (e.g., alkali metal salts and alkaline earth metal salts), quaternary ammonium salts, acids, and alkalis can be used. Specific examples of the material of the solid electrolyte include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

[Method for Producing Gel Electrolyte Layer]

The gel electrolyte layer of the present disclosure can be produced through polymerization reaction by the cast polymerization method. The cast polymerization method includes: a step of preparing a composition solution; and a step of sandwiching the prepared composition solution between molds or films to allow it polymerize.

The composition solution can be obtained by mixing an electrolytic solution obtained by mixing the ionic liquid or the solid electrolyte with a solvent, a polymerizable material, and, if necessary, the polymerization initiator and other components.

Examples of the polymerizable material include urethaneacrylate monomers, acrylate monomers having a PEO chain, and acrylate monomers having a PMMA chain.

Examples of the mold include: containers formed of, for example, glass and resins; and films to which a release agent is attached. The composition solution can be filled into an empty cell of an electrochemical device as the mold, and the composition solution can be allowed to directly polymerize in the device.

The polymerization reaction is preferably a radical polymerization reaction, and more preferably a thermal radical polymerization reaction or a photoradical polymerization reaction. When the radical polymerization is performed, a composition solution is preferably subjected to deoxygenation in advance.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohols, and mixture solvents thereof.

The polymerization initiator is not particularly limited and may be appropriately selected depending on the intended purpose. Examples of the polymerization initiator include a radical polymerization initiator.

Examples of the radical polymerization initiator include a thermal polymerization initiator and a photopolymerization initiator. These may be used alone or in combination.

Examples of the thermal polymerization initiator include: azo compounds such as 2,2'-azobisisobutyronitrile, dimethyl-2,2'-azobisisobutylate, 2,2'-azobis(2,4-dimethylvaleronitrile), and 2,2'-azobis[2(2-imidazolin-2-yl)propane]; and organic peroxides such as 2,5-dimethyl-2,5-bis(tert-butylperoxy)hexane and di(4-tert-butylcyclohexyl)peroxydicarbonate. These may be used alone or in combination.

Examples of the photopolymerization initiator include: ketal-based photopolymerization initiators such as 2,2-dimethoxy-1,2-diphenylethan-1-one; acetophenone-based photopolymerization initiators such as 1-hydroxycyclohexylphenylketone, 2,2-diethoxyacetophenone, 2,2-dimethoxy-2-phenylacetophenone, 4-phenoxydichloroacetophenone, and 4-(t-butyl)dichloroacetophenone; and benzoin ether-based photopolymerizaion initiators such as benzoin methyl ether, benzoin ethyl ether, benzoin propyl ether, benzoin isopropyl ether, and benzoin isobutyl ether. These may be used alone or in combination.

An amount of the polymerization initiator is not particularly limited and may be appropriately selected depending on the intended purpose. The amount of the polymerization initiator is preferably 0.001 parts by mass or more but 5 parts by mass or less, more preferably 0.01 parts by mass or more but 2 parts by mass or less, and particularly preferably 0.01 parts by mass or more but 1 part by mass or less, relative to 100 parts by mass of the monomer component.

Another method for producing the gel electrolyte layer is not particularly limited to the above. A method where a composition solution before polymerization is coated on the electrochromic layer and is allowed to polymerize by heat or irradiation of ultraviolet rays can also be used. In addition, it is possible to use a method where the supports on which the electrochromic layer is formed face each other with a gap (from about 5 μm through about 150 μm) being maintained, and the composition solution is filled therebetween and is allowed to polymerize through irradiation of ultraviolet rays or heating.

FIG. 1A illustrates a view as if the respective layers are completely separated for the sake of convenience. However, the composition of the gel electrolyte may be partially permeated in the electrochromic layer depending on the composition and the production method of the gel electrolyte layer.

[Protective Layer]

The protective layer 17 is formed so as to physically and chemically protect the side parts of the electrochromic element. The protective layer 17 can be formed by coating, for example, an ultraviolet curable insulating resin or a thermosetting insulating resin so as to cover the side surfaces and/or the upper surface, followed by curing. In addition, a protective layer obtained by laminating a curing resin and an inorganic material is preferable. The laminated layer structure including the inorganic material can improve barrier property against oxygen and water.

The inorganic material is preferably a material having high insulating property, high transparency, and high durability. Specific examples of the material include oxides or sulfides of, for example, silicon, aluminum, titanium, zinc, and tin, and mixtures thereof. These films can be easily formed through the vacuum film formation process such as the sputtering method or the vapor deposition method.

An average thickness of the protective layer 17 is not particularly limited and may be appropriately selected depending on the intended purpose. The average thickness thereof is preferably 5 μm or more but 100 μm or less. Moreover, the protective layer may be formed after thermoforming.

The electrochromic element of the present disclosure is not particularly limited and may be appropriately selected depending on the intended purpose, but the electrochromic element of the present disclosure preferably has the following characteristics.

A refractive index n1 of the support, a refractive index n2 of the optical lens, and a refractive index n3 of the adhesive layer preferably satisfy the following expression: $n1\_n3n2$ in terms of a decrease in reflection at the adhesion interface and transparency.

Alternatively, the refractive index n1 of the support, the refractive index n2 of the optical lens, and the refractive index n3 of the adhesive layer preferably satisfy the following expression: $n2 n3 n1$ in terms of a decrease in reflection at the adhesion interface and transparency.

The refractive index can be measured by, for example, a multi-wavelength Abbe refractometer (available from ATAGO CO., LTD., DR-M2).

A coefficient of linear expansion $\alpha 1$ of the support, a coefficient of linear expansion $\alpha 2$ of the optical lens, and a coefficient of linear expansion $\alpha 3$ of the adhesive layer preferably satisfy the following expression: $\alpha 1 \leq \alpha 3 \leq \alpha 2$ in terms of the thermal stability and the mechanical stability.

The coefficient of linear expansion $\alpha 1$ of the support, the coefficient of linear expansion $\alpha 2$ of the optical lens, and the coefficient of linear expansion $\alpha 3$ of the adhesive layer preferably satisfy the following expression: $\alpha 2 \leq \alpha 3 \leq \alpha 1$ in terms of the thermal stability and the mechanical stability.

The coefficient of linear expansion can be measured by, for example, a TMA (thermomechanical analysis) device (available from KOBELCO Research Institute).

An Abbe number v1 of the support and an Abbe number v2 of the optical lens preferably satisfy the following expression: $v1 \leq v2$ in terms of a decrease in the chromatic aberration.

The Abbe number can be measured by, for example, a multi-wavelength Abbe refractometer (available from ATAGO CO., LTD., DR-M2).

<Electrochromic Element of First Embodiment>

FIG. 1C is a cross-sectional view illustrating an electrochromic element obtained after an optical lens is attached to the electrochromic element according to the first embodiment. Referring to FIG. 1C, an optical lens 21 is attached on one outer surface of a laminated body (electrochromic element 10), and a first support 11 is provided on the other outer surface.

A material of the optical lens 21 is not particularly limited and may be appropriately selected depending on the intended purpose. For example, transparent materials such as polycarbonate resins, allyl diglycol carbonate resins, diallyl carbonate resins, diallyl phthalate resins, urethane-based resins, thiourethane resins, episulfide resins, methacrylate resins, and cycloolefin resins are suitably used.

So that the transparent material is in contact with one outer surface, the transparent material is melted, followed by curing again, or light or heat is applied thereto for curing, to adhesively form the optical lens 21. Note that, a method for adhesively forming the optical lens 21 is not limited to these methods.

When a radius of curvature after curing is set by taking deformation caused by, for example, curing shrinkage into account and when at least one of a curvature of an incident surface of the optical lens 21 or a curvature of an emission surface of the optical lens 21 is adjusted, the electrochromic element can have any strength.

When a desired curved surface shape is formed through cutting processing after formation of the optical lens 21, a lens processing (strength processing) according to users-specific conditions can be achieved. That is, it is not necessary to provide molds and members for each product shape, and it is easy to produce various kinds of products with high precision in a small lot production.

<Electrochromic Element of Modification Example 1 of First Embodiment>

A modification example 1 of the first embodiment exemplifies an electrochromic element having a layer structure different from that of the first embodiment. In the first embodiment, the description of the same components as those in the embodiments that have already been described may be omitted.

Figure 2A:
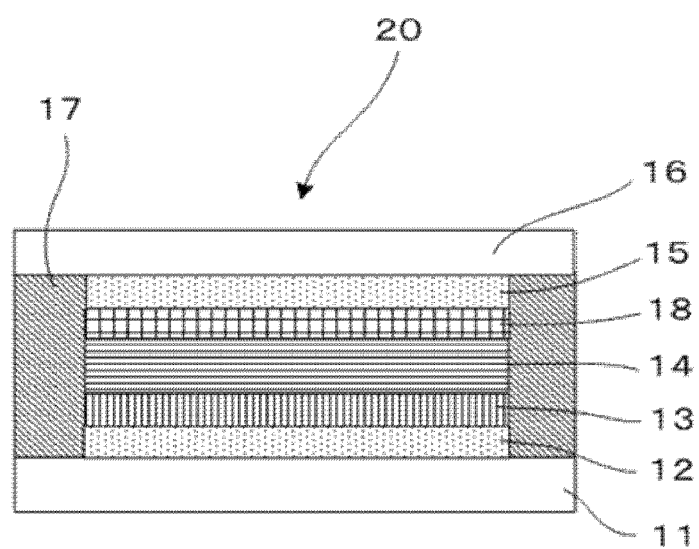
FIG. 2A is a schematic cross-sectional view illustrating an example of an electrochromic element obtained before thermoforming according to modification example 1 of the first embodiment.
Figure 2B:
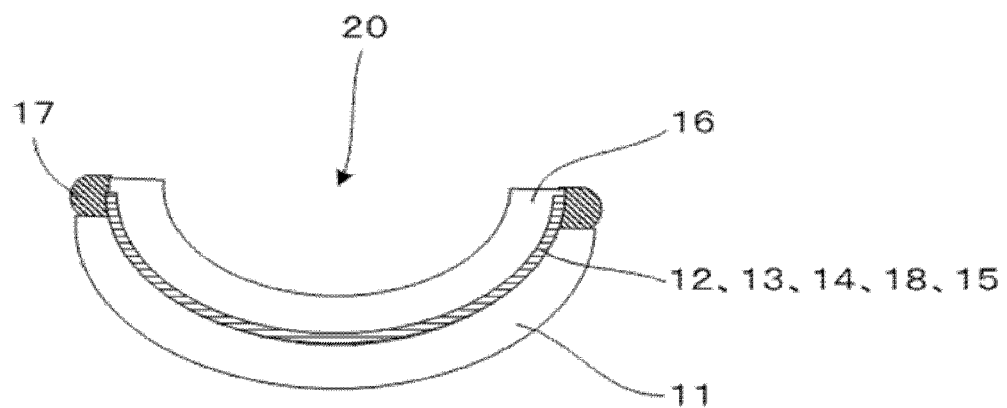
FIG. 2B is a schematic cross-sectional view illustrating an example of the electrochromic element obtained after thermoforming according to modification example 1 of the first embodiment.
Figure 2C:
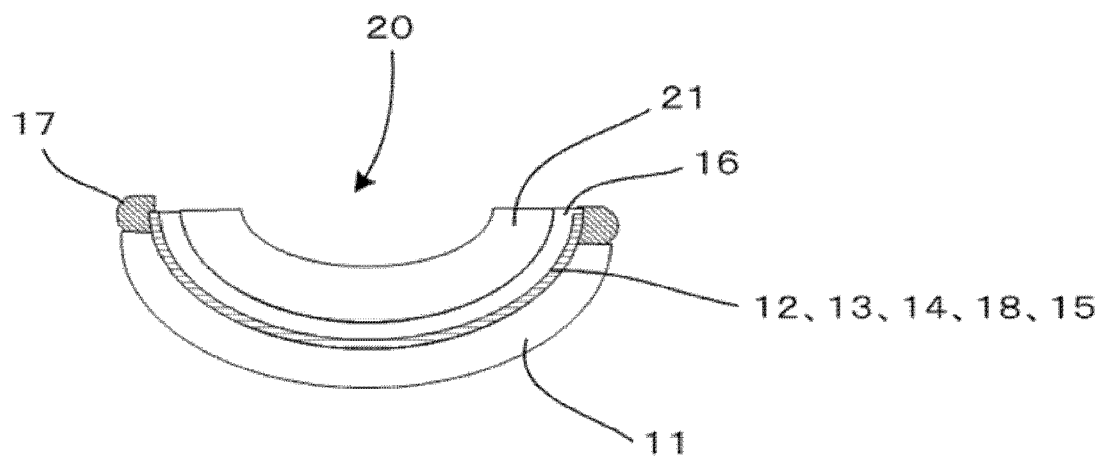
FIG. 2C is a schematic cross-sectional view illustrating an example of the electrochromic element obtained after an optical lens is attached to the electrochromic element according to modification example 1 of the first embodiment.

FIG. 2A, FIG. 2B, and FIG. 2C are each a cross-sectional view exemplifying the modification example 1 of the first embodiment.

Referring to FIG. 2A, FIG. 2B, and FIG. 2C, an electrochromic element 20 of the modification example 1 of the first embodiment is different from the electrochromic element 10 according to the first embodiment (see FIG. 1A, FIG. 1B, and FIG. 1C) in that the electrochromic element 20 includes a deterioration preventing layer 18 that is contact with the gel electrolyte layer 14 and the second electrode layer 15.

In the modification example 1 of the first embodiment, the deterioration preventing layer 18 is formed in order to prevent deterioration caused by electrochemical reaction of the second electrode layer 15. This makes it possible to provide an electrochromic element that further has excellent repeating characteristics in addition to the effect of the first embodiment, in the electrochromic element according to the modification example 1 of the first embodiment.

A role of the deterioration preventing layer 18 is to perform reverse reaction to the electrochromic layer 13 and to keep balance of electric charges, which prevents the second electrode layer 15 from corrosion and deterioration through irreversible oxidation-reduction reaction. As a result, the repeating stability of the electrochromic element 20 is improved. Note that, the reverse reaction includes a function as a capacitor in addition to a case where the deterioration preventing layer is oxidized and reduced.

A material of the deterioration preventing layer 18 is not particularly limited and may be appropriately selected depending on the intended purpose, so long as it is a material that prevents corrosion through irreversible oxidation-reduction reaction of the first electrode layer 12 and the second electrode layer 15. As the material of the deterioration preventing layer 18, conductive or semiconductive metal oxides including tin-antimony oxide, nickel oxide, titanium oxide, zinc oxide, tin oxide, or a plurality of the foregoing metal oxides can be used. Moreover, when coloring of the deterioration preventing layer does not matter, the same material as that of the electrochromic material can be used.

Among them, when an electrochromic element is produced as an optical element such as a lens required for transparency, a material having high transparency is preferably used as the deterioration preventing layer 18. Preferable examples of the material include n-type semiconductive oxide particles (n-type semiconductive metal oxides). Examples of the n-type semiconductive metal oxide include: titanium oxide, tin oxide, and zinc oxide, each of which is formed of particles having a primary particle diameter of 100 nm or less; compound particles including a plurality of the aforementioned oxides; and mixtures thereof.

In addition, when the deterioration preventing layer 18 is included, the electrochromic layer 13 is preferably a material that changes color through oxidization reaction. As a result, at the same time when the electrochromic layer undergoes oxidization reaction, the n-type semiconductive metal oxide easily undergoes reduction (electron injection), which makes it possible to decrease driving voltage.

In such an embodiment, a particularly preferable electrochromic material is an organic polymer material. The organic polymer material makes it possible to easily produce a film through, for example, a coating formation process and to adjust or control colors by its molecular structure. Specific examples of the organic polymer materials are reported in, for example, "Chemistry of Materials review 2011. 23, 397-415 Navigating the Color Palette of Solution-Processable Electrochromic Polymers (Reynolds)", "Macromolecules 1996. 29 7629-7630 (Reynolds)", and "Polymer journal, Vol. 41, No. 7, Electrochromic Organic Matallic Hybrid Polymers".

Examples of the organic polymer material include poly (3,4-ethylenedioxythiophene)-based materials and complex-formed polymers of bis(terpyridine) and an iron ion.

Meanwhile, as the deterioration preventing layer 18, a material of a p-type semiconductor layer having high transparency is, for example, an organic material including a nitroxyl radical (NO radical). Examples thereof include derivatives of 2,2,6,6-tetramethylpiperidine-N-oxyl (TEMPO) and polymer materials of the derivatives.

The deterioration preventing layer 18 is not particularly limited. For example, a material for the deterioration preventing layer can be mixed with the gel electrolyte layer 14, to impart a deterioration preventing function to the gel electrolyte layer 14. In that case, the layer structure becomes the same as the structure of the electrochromic element 10 of the first embodiment in FIG. 1A, FIG. 1B, and FIG. 1C.

A method for forming the deterioration preventing layer 18 is not particularly limited and may be appropriately selected depending on the intended purpose. Examples of the method include the vacuum vapor deposition method, the sputtering method, and the ion plating method. Moreover, various printing methods such as the spin coating method, the casting method, the micro gravure coating method, the gravure coating method, the bar coating method, the roll coating method, the wire bar coating method, the dip coating method, the slit coating method, the capillary coating method, the spray coating method, the nozzle coating method, the gravure printing method, the screen printing method, the flexographic printing method, the offset printing method, the reverse printing method, and the inkjet printing method can be used, so long as the material of the deterioration preventing layer 18 can be coated for formation.

<Electrochromic Element of Modification Example 2 of First Embodiment>

An electrochromic element of a modification example 2 of the first embodiment exemplifies an electrochromic element having a layer structure different from that of the first embodiment. In the modification example 2 of the first embodiment, the description of the same components as those in the embodiments that have already been described may be omitted.

Figure 3A:
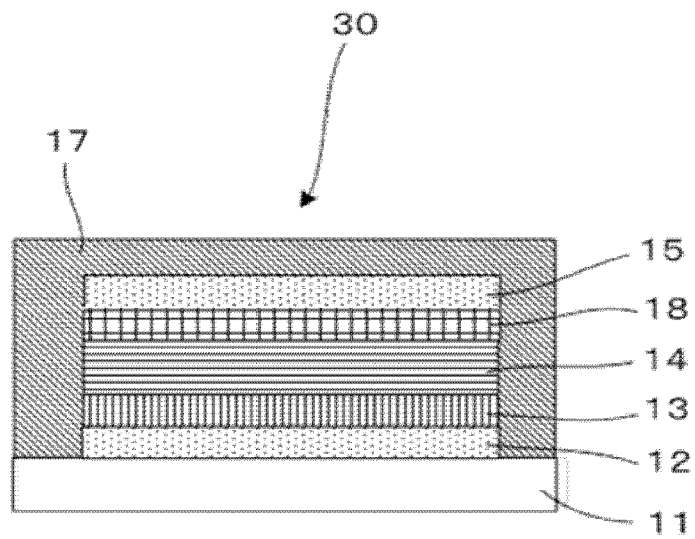
FIG. 3A is a schematic cross-sectional view illustrating an example of an electrochromic element obtained before thermoforming according to modification example 2 of the first embodiment.
Figure 3B:
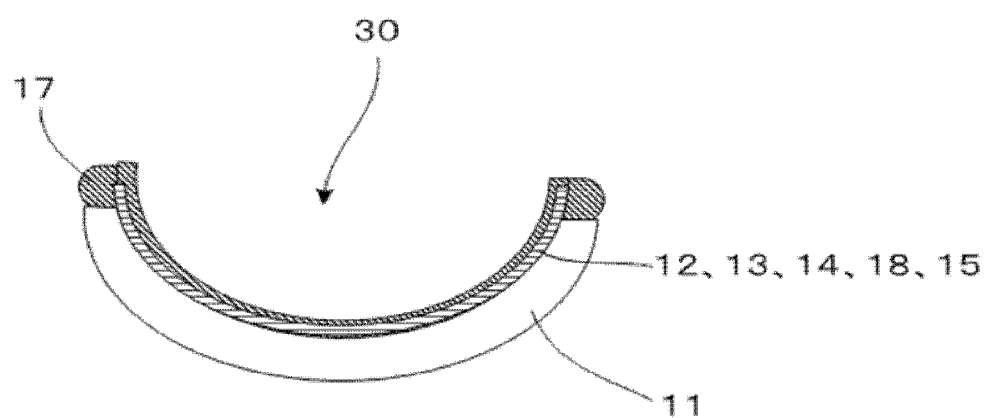
FIG. 3B is a schematic cross-sectional view illustrating an example of the electrochromic element obtained after thermoforming according to modification example 2 of the first embodiment.
Figure 3C:
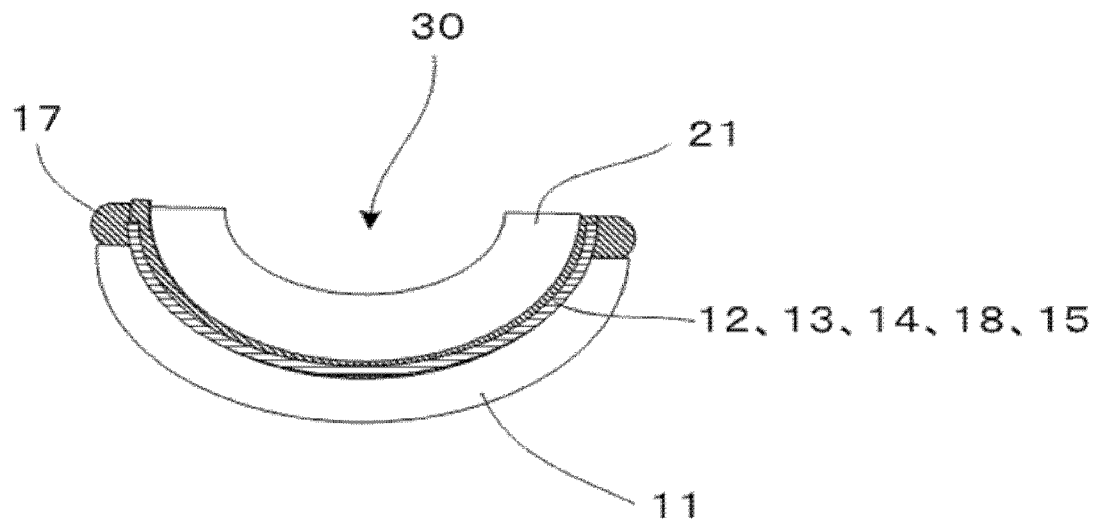
FIG. 3C is a schematic cross-sectional view illustrating an example of the electrochromic element obtained after an optical lens is attached to the electrochromic element according to modification example 2 of the first embodiment.

FIG. 3A, FIG. 3B, and FIG. 3C are each a cross-sectional view exemplifying an electrochromic element 30 of the modification example 2 of the first embodiment. Referring to FIG. 3A, FIG. 3B, and FIG. 3C, the electrochromic element 30 of the modification example 2 of the first embodiment is different from the electrochromic element 20 according to the modification example 1 of the first embodiment (see FIG. 2A, FIG. 2B, and FIG. 2C) in that the second support 16 is omitted and the protective layer 17 is formed on the second electrode layer 15 in the electrochromic element 30 of the modification example 2 of the first embodiment. The protective layer 17 formed on the second electrode layer 15 can include the same material as the materials of the protective layer 17 formed on the side parts. Note that, the material of the protective layer 17 formed on the second electrode layer 15 may be identical to or different from the material of the protective layer 17 formed on the side parts. The electrochromic element 30 of the third embodiment can be thinner and can be produced at low cost because it is formed of one support.

FIG. 3C is a cross-sectional view presenting a state obtained after attachment of the optical lens of the electrochromic element 30 of the modification example 2 of the first embodiment.

The electrochromic element 30 of the modification example 2 of the first embodiment has the same structure as that of the modification example 1 of the first embodiment except that the optical lens 21 is attached on one outer surface of the laminated body (electrochromic element 30) and the other outer surface includes the first support 11. Therefore, detailed description is omitted herein.

<Electrochromic Element of Modification Example 3 of First Embodiment>

An electrochromic element of a modification example 3 of the first embodiment exemplifies an electrochromic element having a layer structure different from that of the first embodiment. In the modification example 3 of the first embodiment, the description of the same components as those in the embodiments that have already been described may be omitted.

Figure 4A:
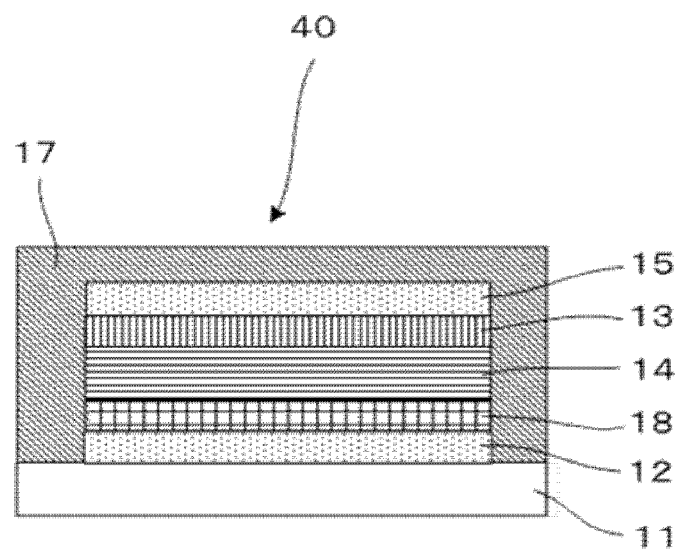
FIG. 4A is a schematic cross-sectional view illustrating an example of an electrochromic element obtained before thermoforming according to modification example 3 of the first embodiment.
Figure 4B:
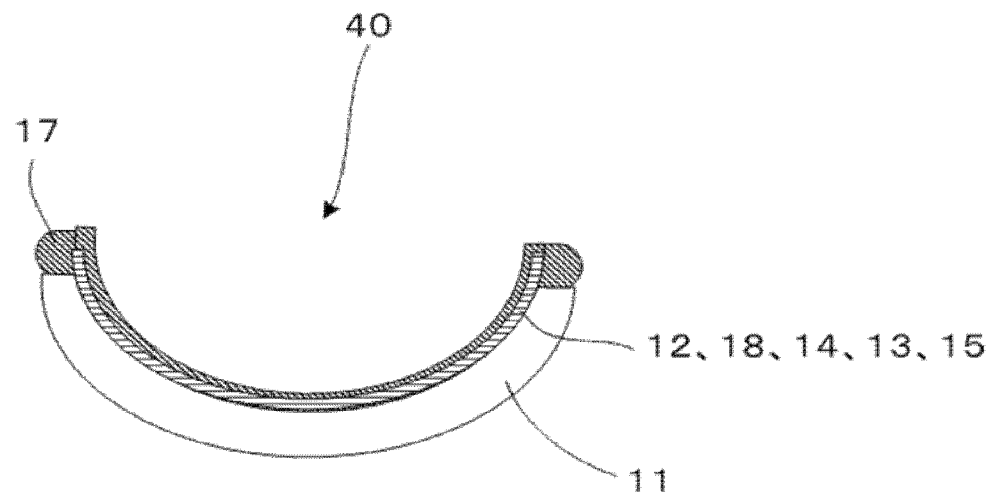
FIG. 4B is a schematic cross-sectional view illustrating an example of the electrochromic element obtained after thermoforming according to modification example 3 of the first embodiment.
Figure 4C:
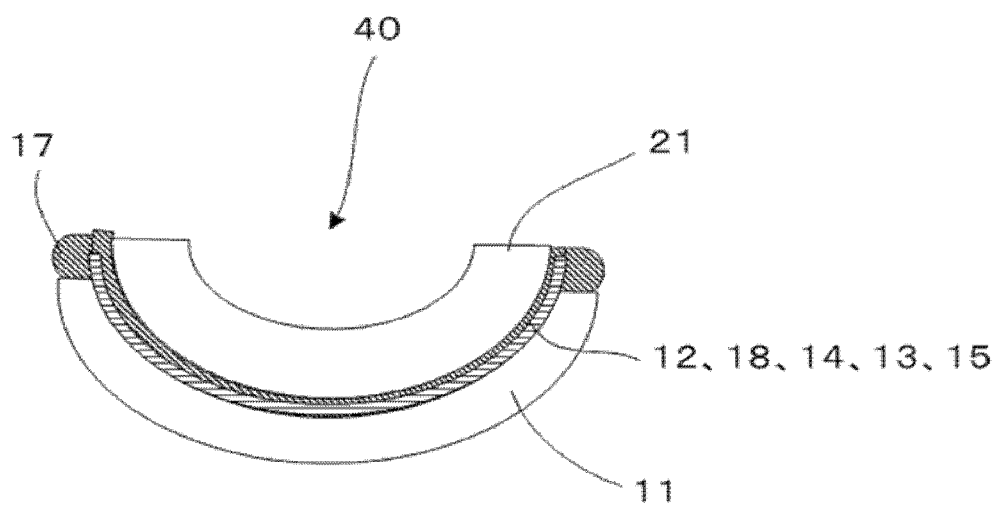
FIG. 4C is a schematic cross-sectional view illustrating an example of the electrochromic element obtained after an optical lens is attached to the electrochromic element according to modification example 3 of the first embodiment.

FIG. 4A, FIG. 4B, and FIG. 4C are each a cross-sectional view exemplifying an electrochromic element 40 of the modification example 3 of the first embodiment. Referring to FIG. 4A, FIG. 4B, and FIG. 4C, the electrochromic element 40 of the modification example 3 of the first embodiment is different from the electrochromic element 30 of the modification example 2 of the first embodiment (see FIG. 3A, FIG. 3B, and FIG. 3C) in that arrangement of the electrochromic layer 13 and arrangement of the deterioration preventing layer 18 are reversed.

The electrochromic element 40 of the modification example 3 of the first embodiment is different in arrangement of the layer structure. However, when voltage is applied between the first electrode layer 12 and the second electrode layer 15, the electrochromic layer 13 gives and receives electric charges to cause oxidation-reduction reaction, resulting in coloring and decoloring.

FIG. 4C is a cross-sectional view presenting a state obtained after attachment of the optical lens of the electrochromic element 40 of the modification example 3 of the first embodiment.

The electrochromic element 40 of the modification example 3 of the first embodiment has the same structure as that of the modification example 1 of the first embodiment except that the optical lens 21 is attached on one outer surface of the laminated body (electrochromic element 40) and the other outer surface includes the first support 11. Therefore, detailed description is omitted herein.

<Electrochromic Element of Modification Example 4 of First Embodiment>

An electrochromic element of a modification example 4 of the first embodiment exemplifies an electrochromic element in which the optical lens 21 is formed so as to embed the electrochromic element, as exemplified in FIG. 1B that is the first embodiment. In the modification example 4 of the first embodiment, the description of the same components as those in the embodiments that have already been described may be omitted.

Figure 5:
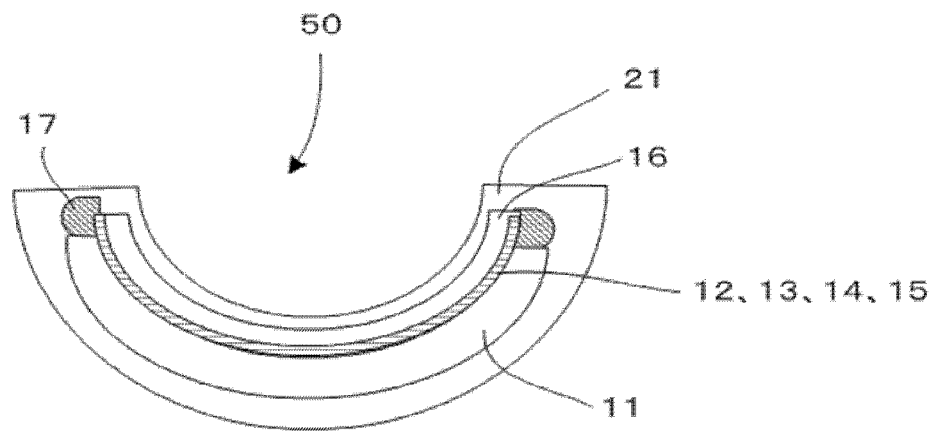
FIG. 5 is a schematic cross-sectional view illustrating an example of an electrochromic element obtained after an optical lens is attached to the electrochromic element according to modification example 4 of the first embodiment.

FIG. 5 is a cross-sectional view exemplifying an electrochromic element 50 of the modification example 4 of the first embodiment. Referring to FIG. 5, the optical lens 21 is formed so as to embed the electrochromic element 50.

The electrochromic element 50 is placed so as to be immersed in a transparent resin in the state of being melted. While the state is maintained, the melted resin is cooled and cured again or the melted resin is cured by application of light or heat. As a result, the optical lens 21 can be formed so as to embed the electrochromic element 50.

<Electrochromic Element of Modification Example 5 of First Embodiment>

The modification example 5 of the first embodiment exemplifies an electrochromic element 60 in which the electrochromic element and the optical lens 21, as exemplified in FIG. 1B that is the first embodiment, are attached via an adhesive layer 19. In the modification example 5 of the first embodiment, the description of the same components as those in the embodiments that have already been described may be omitted.

Figure 6:
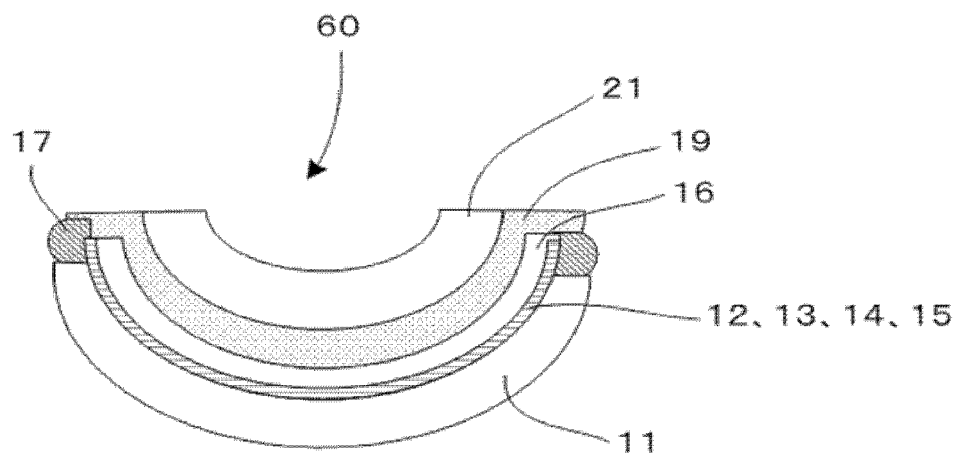
FIG. 6 is a schematic cross-sectional view illustrating an example of an electrochromic element obtained after an optical lens is attached to the electrochromic element according to modification example 5 of the first embodiment.

FIG. 6 is a cross-sectional view exemplifying the electrochromic element 60 of the modification example 5 of the first embodiment. Referring to FIG. 6, the optical lens 21 is attached on the second support 16 via the adhesive layer 19. This makes it possible to produce the optical lens 21 independently from the production step of the electrochromic element 60 and to employ a suitable method for producing the optical lens. Therefore, it is easy to produce a product with high precision. Moreover, because inventory management can be independently performed, it is easy to produce various kinds of products in a small lot production.

A material of the adhesive layer 19 is not particularly limited and may be appropriately selected depending on the intended purpose. Examples thereof include transparent materials such as epoxy resins, urethane-based resins, acryl-based resins, vinyl acetate-based resins, and modified polymer-based resins.

An average thickness of the adhesive layer is not particularly limited and may be appropriately selected depending on the intended purpose. The average thickness thereof is preferably 3 μm or more but 200 μm or less.

<Electrochromic Element of Second Embodiment>

The second embodiment is an embodiment where a gel electrolyte enters an electrochromic layer in the electrochromic element exemplified in FIG. 1A that is the first embodiment. The electrochromic layer may be porous, and the gel electrolyte may enter the parts of the pores.

(Electrochromic Light-Adjusting Element)

An electrochromic light-adjusting element of the present disclosure includes the electrochromic element of the present disclosure.

Examples of the electrochromic light-adjusting element include anti-glare mirrors and light-adjusting glass.

(Electrochromic Device)

An electrochromic device of the present disclosure includes the electrochromic element of the present disclosure or the electrochromic light-adjusting element of the present disclosure, and further includes other units if necessary.

The other units are not particularly limited and may be appropriately selected depending on uses. Examples of the other units include power sources, fixing units, and control units.

Examples of the electrochromic device include light-adjusting spectacles, active ND filters for cameras, binoculars, opera glasses, cycling goggles, clocks, watches, electronic paper, electronic albums, electronic decoration members, and electronic advertisement boards.

Figure 7:
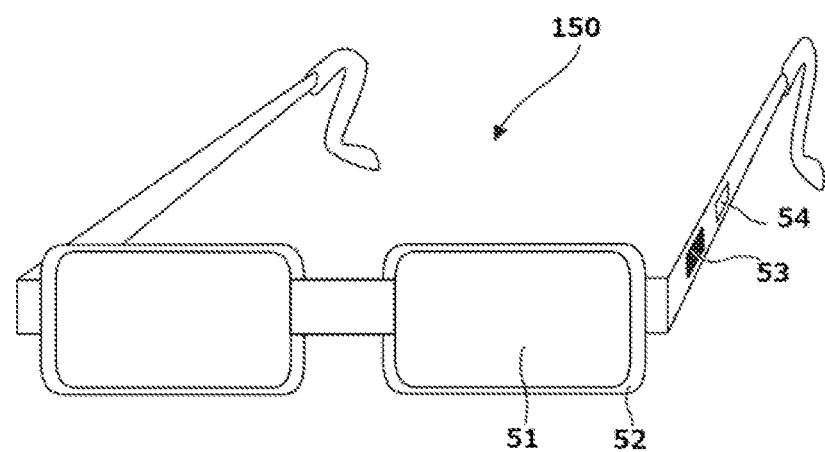
FIG. 7 is a perspective view illustrating an example of electrochromic light-adjusting spectacles including the electrochromic light-adjusting element of the present disclosure.

FIG. 7 is a perspective view illustrating electrochromic light-adjusting spectacles including the electrochromic light-adjusting element of the present disclosure. With reference to FIG. 7, the electrochromic light-adjusting spectacles 150 include an electrochromic light-adjusting element 51, and a frame 52 of the spectacles, a switch 53, and a power source 54. The electrochromic light-adjusting element 51 is the electrochromic light-adjusting element of the present disclosure, which has been processed into a desired shape.

A pair of the electrochromic light-adjusting elements 51 are incorporated into the frame 52 of the spectacles. The frame 52 of the spectacles is provided with the switch 53 and the power source 54. The power source 54 is electrically connected to the first electrode and the second electrode with wirings (not illustrated) via the switch 53.

By switching the switch 53, one state can be selected, for example, from a state where positive voltage is applied between the first electrode and the second electrode, a state where negative voltage is applied between the first electrode and the second electrode, and a state where no voltage is applied.

As the switch 53, for example, any switch such as a slide switch or a push switch can be used, as long as the switch is a switch capable of switching at least the above-mentioned three states.

As the power source 54, for example, any DC power source such as a button battery or a solar battery can be used. The power source 54 is capable of applying negative or positive (±) several voltages between the first electrode and the second electrode.

For example, the pair of the electrochromic light-adjusting elements 51 color in a predetermined color when positive voltage is applied between the first electrode and the second electrode. Moreover, the pair of the electrochromic light-adjusting elements 51 decolor and become transparent when negative voltage is applied between the first electrode and the second electrode.

However, there is a case where the electrochromic light-adjusting elements color when negative voltage is applied between the first electrode and the second electrode, and the electrochromic light-adjusting elements decolor and become transparent when positive voltage is applied, depending on properties of a material used for the electrochromic layer. Once the electrochromic light-adjusting elements color, the color is maintained without applying voltage between the first electrode and the second electrode.

EXAMPLES

Hereinafter, the present disclosure will be described by way of Examples. However, the present disclosure should not be construed as being limited to these Examples.

Example 1

<Production of Electrochromic Element>

Example 1 is an example for producing an electrochromic element 10 illustrated in FIGS. 1A, 1B, and 1C. The electrochromic element 10 produced in Example 1 can be also used as a light-adjusting lens element.

—Formation of First Electrode and Electrochromic Layer—

First, as a first support 11, an ellipse polycarbonate resin substrate (AD5503, softening point: 145° C., obtained from TEIJIN LIMITED) (maximum major axis length: 80 mm×maximum minor axis length: 55 mm, and thickness: 0.5 mm) was provided.

On the first support, an ITO film was formed by the sputtering method so as to have a thickness of about 100 nm, to form a first electrode layer 12.

Next, on the surface of the ITO film, a dispersion liquid of titanium oxide nanoparticles (product name: SP210, obtained from Showa Titanium Co., Ltd., average particle diameter: 20 nm) was coated by the spin coating method, followed by an annealing treatment at 120° C. for 15 minutes, to form a nanostructure semiconductor material, which was formed of the film of the titanium oxide particles and had a thickness of about L0 μm.

Then, a 2,2,3,3-tetrafluoropropanol solution containing 1.5% by mass of an electrochromic compound expressed by the following Structural Formula A was coated by the spin coating method, and an annealing treatment was performed at 120° C. for 10 minutes, to bear (adsorb) it on the film of the titanium oxide particles. As a result, an electrochromic layer 13 was formed.

[Structural Formula A]

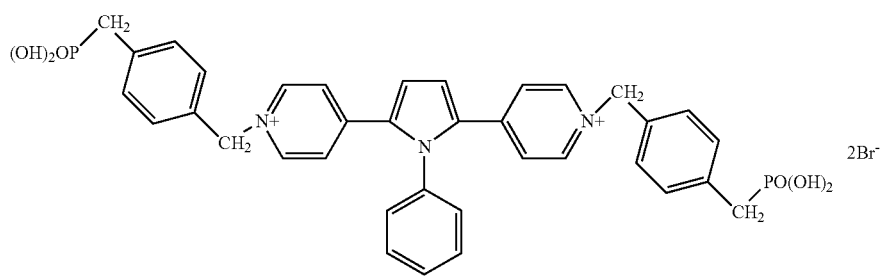

On the electrochromic layer 13, a dispersion liquid of $SiO_2$ particles having an average primary particle diameter of 20 nm (solid concentration of silica: 24.8% by mass, polyvinyl alcohol: 1.2% by mass, and water: 74% by mass) was coated through spin coating, to form an insulating inorganic particle layer having a thickness of 2 μm.

—Formation of Second Electrode Layer—

As a second support 16, a polycarbonate resin substrate having the same shape and thickness as those of the first support 11 was provided. On the second support 16, an ITO film was formed by the sputtering method so as to have a thickness of about 100 nm, to form a second electrode layer 15.

—Production of Gel Electrolyte Layer—

A solution was coated on the surface of a PET film (NP75C, obtained from PANAC CO., LTD.) that had undergone a release treatment. The solution was obtained by mixing a polymerizable material (V3877, obtained from DAIDO CHEMICAL CORPORATION) and an electrolyte (1-ethyl-3-methylimidazolium tetracyanoborate, EMIMTCB) by a mass ratio (20:80) and mixing 0.5% by mass of a photopolymerization initiator (IRGACURE 184, obtained from Nippon Kayaku Co., Ltd.) relative to an amount of the polymerizable material. The resultant was pasted with the PET film (NP75A, PANAC CO., LTD.) that had undergone a release treatment and was cured with ultraviolet rays (UV), to produce a gel electrolyte layer.

—Production of Laminated Body—

The release film was exfoliated and the produced gel electrolyte layer was pasted on the surface of the insulating inorganic particle layer. Then, the surface of the second electrode layer of the second support and the surface of the gel electrolyte layer were pasted with each other, to produce a laminated body.

—Formation of Protective Layer—

An ultraviolet-ray-curable adhesive (product name: KARAYAD R604, obtained from Nippon Kayaku Co., Ltd.) was added dropwise to side parts of the pasted laminated body, and was irradiated with ultraviolet rays for curing, to form a protective layer 17 having a thickness of 3 μm.

As described above, an electrochromic element 10 obtained before thermoforming as presented in FIG. 1A was produced.

—3D Thermoforming—

The produced electrochromic element obtained before thermoforming was sandwiched by a convex mold and a concave mold having a radius of curvature of about 130 mm upon application of heat at 135° C., to produce an electrochromic element 10 obtained after thermoforming that has as a three-dimensional (3D) spherical shape as presented in FIG. 1B. The temperature of the mold was set to 146° C.

The temperature of the mold needs to be set to a temperature near a softening temperature of each support material. When the temperature of the mold is lower than the softening temperature of each support material, sufficient shaping cannot be performed. When the temperature of the mold is too high, it takes time to cool down, which decreases productivity.

—Adhesive Formation of Optical Lens—

As a material of an optical lens to be attached to the produced electrochromic element, a polycarbonate resin (IUPILON CLS3400, obtained from Mitsubishi Engineering-Plastics Corporation) was used. The electrochromic element obtained after thermoforming was inserted into a mold, followed by injection molding, to integrally mold the materials so as to have a lens shape (see FIG. 1).

The surface of the optical lens part attached on the electrochromic element was subjected to cutting processing, which made it possible to have a curvature. Moreover, both the electrochromic element and the optical lens could be processed through the cutting processing so as to have such a size that fits into a spectacle frame.

<Evaluation>

—Phase Separation Temperature of Gel Electrolyte Layer—

The gel electrolyte layer was placed on a hot plate, followed by a heating treatment. At that time, the surface of the film was visually observed, and a temperature at which a liquid was generated on the surface of the gel electrolyte layer was recorded. This temperature was regarded as a phase separation temperature. When the phase separation temperature of the gel electrolyte layer produced in Example 1 was measured, the phase separation temperature reached more than 200° C. Therefore, the measurement was stopped. Results are presented in Table 1-1 and Table 1-2.

—Exfoliation—

Whether the electrochromic element to which the optical lens was attached was exfoliated was visually observed, and was evaluated based on the following evaluation criteria. Results are presented in Table 1-1 and Table 1-2.

A: Exfoliation that could be visually observed did not occur.

B: Exfoliation that could be visually observed occurred.

Examples 2 to 27 and Comparative Examples 1 to 12

Electrochromic elements of Examples 2 to 27 and Comparative Examples 1 to 12 were each produced in the same manner as in Example 1 except that the polymerizable material used in the gel electrolyte layer was produced based on the formulations and the mass ratios described in Table 1-1 and Table 1-2. As the electrolyte, 1-ethyl-3-methylimidazolium tetracyanoborate (EMIMTCB) was used. As the photopolymerization initiator, 0.5% by mass of IRGACURE 184 (obtained from Nippon Kayaku Co., Ltd.) relative to a total amount of the acrylate was mixed therewith.

The produced electrochromic elements of Examples 2 to 27 and Comparative Examples 1 to 12 were evaluated for the exfoliation and the phase separation temperature of the gel electrolyte layer in the same manners as in Example 1. Results are presented in Table 1-1 and Table 1-2.

TABLE 1-1

| No. | Other polymerizable material | | Urethane acrylate | | PEO acrylate | | PMMA acrylate | | Electrolyte | Phase separation | Exfoliation |
|---|---|---|---|---|---|---|---|---|---|---|---|
| | Product name | Mass ratio | Product name | Mass ratio | Product name | Mass ratio | Product name | Mass ratio | Mass ratio | temperature of gel electrolyte | evaluation |
| Comp. Ex. 1 | | | | | A400 | 20% | | | 80% | 25° C. | B |
| Comp. Ex. 2 | | | | | A600 | 20% | | | 80% | 60° C. | B |
| Comp. Ex. 3 | | | | | A1000 | 20% | | | 80% | 60° C. | B |
| Comp. Ex. 4 | | | | | A400 | 50% | | | 50% | 80° C. | B |
| Comp. Ex. 5 | | | | | PEG400 | 71% | | | 29% | 80° C. | B |
| Ex. 1 | V3877 | 20% | | | | | | | 80% | >200° C. | A |
| Ex. 2 | | | UXF4002 | 20% | | | | | 80% | >200° C. | A |
| Ex. 3 | | | UV3000B | 20% | | | | | 80% | >200° C. | A |
| Ex. 4 | | | UXF4002 | 15% | AM-90G | 5% | | | 80% | >200° C. | A |
| Ex. 5 | | | UXF4002 | 15% | AM-130G | 5% | | | 80% | >200° C. | A |
| Ex. 6 | | | UXF4002 | 15% | AM-230G | 5% | | | 80% | >200° C. | A |
| Ex. 7 | | | UXF4002 | 15% | | | AA-6 | 5% | 80% | >200° C. | A |
| Ex. 8 | | | UV3000B | 15% | AM-90G | 5% | | | 80% | >200° C. | A |
| Ex. 9 | | | UV3000B | 15% | AM-130G | 5% | | | 80% | >200° C. | A |
| Ex. 10 | | | UV3000B | 15% | | | AA-6 | 5% | 80% | >200° C. | A |
| Ex. 11 | | | UN9200A | 20% | | | | | 80% | 160° C. | A |

TABLE 1-1-continued

| No. | Other polymerizable material Product name | Other polymerizable material Mass ratio | Urethane acrylate Product name | Urethane acrylate Mass ratio | PEO acrylate Product name | PEO acrylate Mass ratio | PMMA acrylate Product name | PMMA acrylate Mass ratio | Electrolyte Mass ratio | Phase separation temperature of gel electrolyte | Exfoliation evaluation |
|---|---|---|---|---|---|---|---|---|---|---|---|
| Comp. Ex. 6 | | | UV3200B | 20% | | | | | 80% | 120° C. | B |
| Comp. Ex. 7 | | | UN350 | 20% | | | | | 80% | 120° C. | B |
| Ex. 12 | | | UV3200B | 10% | AM-90G | 10% | | | 80% | 160° C. | A |

TABLE 1-2

| No. | Other polymerizable material Product name | Other polymerizable material Mass ratio | Urethane acrylate Product name | Urethane acrylate Mass ratio | PEO acrylate Product name | PEO acrylate Mass ratio | PMMA acrylate Product name | PMMA acrylate Mass ratio | Electrolyte Mass ratio | Phase separation temperature of gel electrolyte | Exfoliation evaluation |
|---|---|---|---|---|---|---|---|---|---|---|---|
| Ex. 13 | z | z | UV3200B | 5% | AM-90G | 15% | | | 80% | >200° C. | A |
| Ex. 14 | | | UN9200A | 5% | AM-90G | 15% | | | 80% | >200° C. | A |
| Ex. 15 | | | UN350 | 5% | AM-90G | 15% | | | 80% | >200° C. | A |
| Ex. 16 | | | UV3200B | 5% | | | AA-6 | 15% | 80% | >200° C. | A |
| Ex. 17 | | | UN9200A | 5% | | | AA-6 | 15% | 80% | >200° C. | A |
| Ex. 18 | | | UN350 | 5% | | | AA-6 | 15% | 80% | >200° C. | A |
| Comp. Ex. 8 | | | UXT6100 | 20% | | | | | 80% | 25° C. | B |
| Comp. Ex. 9 | | | UX5000 | 20% | | | | | 80% | 25° C. | B |
| Comp. Ex. 10 | | | UX4101 | 20% | | | | | 80% | 25° C. | B |
| Comp. Ex. 11 | | | UXT6100 | 10% | AM-90G | 10% | | | 80% | 120° C. | B |
| Ex. 19 | | | UXT6100 | 5% | AM-90G | 15% | | | 80% | 160° C. | A |
| Ex. 20 | | | UX5000 | 5% | AM-90G | 15% | | | 80% | 160° C. | A |
| Ex. 21 | | | UX4101 | 5% | AM-90G | 15% | | | 80% | 160° C. | A |
| Ex. 22 | | | UXT6100 | 5% | | | AA-6 | 15% | 80% | 160° C. | A |
| Ex. 23 | | | UX5000 | 5% | | | AA-6 | 15% | 80% | 160° C. | A |
| Ex. 24 | | | UX4101 | 5% | | | AA-6 | 15% | 80% | 160° C. | A |
| Comp. Ex. 12 | | | UFX4002:UXT6100 = 1:1 | 20% | | | | | 80% | 120° C. | B |
| Ex. 25 | | | | | TA-210 | 20% | | | 80% | 160° C. | A |
| Ex. 26 | | | | | TA-210:AM-90G = 1:1 | 20% | | | 80% | >200° C. | A |
| Ex. 27 | | | | | A400:AM-90G = 1:9 | 20% | | | 80% | >200° C. | A |

Details of abbreviations in Table 1-1 and Table 1-2 are as follows.

—Others (Resins)—
V3877 (obtained from DAIDO CHEMICAL CORPORATION)

—Urethane Acrylates—
UXF4002 (obtained from Nippon Kayaku Co., Ltd.)
UV3000B (obtained from Mitsubishi Chemical Corporation)
UN9200A (obtained from Negami Chemical Industrial Co., Ltd.)
UV3200B (obtained from Mitsubishi Chemical Corporation)
UN350 (obtained from Negami Chemical Industrial Co., Ltd.)
UXT6100 (obtained from Nippon Kayaku Co., Ltd.)
UX5000 (obtained from Nippon Kayaku Co., Ltd.)
UX4101 (obtained from Nippon Kayaku Co., Ltd.)

—PEO Acrylates (Resins Including Polyethylene Oxide (PEO) Chain)—
PEG400 (obtained from Nippon Kayaku Co., Ltd.)
A400 (obtained from SHIN-NAKAMURA CHEMICAL CO., LTD.)
A600 (obtained from SHIN-NAKAMURA CHEMICAL CO., LTD.)
A1000 (obtained from SHIN-NAKAMURA CHEMICAL CO., LTD.)
AM-90G (obtained from SHIN-NAKAMURA CHEMICAL CO., LTD.)
AM-130G (obtained from SHIN-NAKAMURA CHEMICAL CO., LTD.)
AM-230G (obtained from SHIN-NAKAMURA CHEMICAL CO., LTD.)
TA-210 (obtained from DKS Co., Ltd.)

—PMMA Acrylate (Resin Including Polymethyl Methacrylate (PMMA) Chain)—
AA-6 (obtained from TOAGOSEI CO., LTD.)

Examples 28 to 71 and Comparative Example 13

Electrochromic elements of Examples 28 to 71 and Comparative Examples 13 were produced in the same manner as in Example 1 except that the polymerizable material used in the gel electrolyte layer was prepared based on the formulations and the mass ratios described in Table 2-1 and Table 2-2; and the electrolyte used in the gel electrolyte layer was changed to an electrolyte described in Table 2-1 and Table 2-2. As the photopolymerization initiator, 0.5% by mass of IRGACURE 184 (obtained from Nippon Kayaku Co., Ltd.) relative to a total amount of the acrylate or an amount of the other polymerizable material (V3877) was mixed therewith.

The produced electrochromic elements of Examples 28 to 71 and Comparative Examples 13 were evaluated for the exfoliation and the phase separation temperature of the gel electrolyte layer in the same manner as in Example 1. Results are presented in Table 2-1 and Table 2-2.

TABLE 2-1

| No. | Other polymerizable material Product name | Mass ratio | Urethane acrylate Product name | Mass ratio | PEO acrylate Product name | Mass ratio | PMMA acrylate Product name | Mass ratio | Electrolyte Product name | Mass ratio | Phase separation temperature of gel electrolyte | Exfoliation evaluation |
|---|---|---|---|---|---|---|---|---|---|---|---|---|
| Ex. 28 | V3877 | 20% | | | | | | | EMIMTFSI | 80% | >200° C. | A |
| Ex. 29 | | | UFX4002 | 20% | | | | | EMIMTFSI | 80% | >200° C. | A |
| Ex. 30 | | | UFX4002 | 15% | AM-90G | 5% | | | EMIMTFSI | 80% | >200° C. | A |
| Ex. 31 | | | UFX4002 | 15% | | | AA-6 | 5% | EMIMTFSI | 80% | >200° C. | A |
| Ex. 32 | | | UV3000B | 15% | AM-90G | 5% | | | EMIMTFSI | 80% | >200° C. | A |
| Ex. 33 | | | UV3000B | 15% | AM-130G | 5% | | | EMIMTFSI | 80% | >200° C. | A |
| Ex. 34 | | | UV3000B | 15% | | | AA-6 | 5% | EMIMTFSI | 80% | >200° C. | A |
| Ex. 35 | V3877 | 20% | | | | | | | EMIMFSI | 80% | >200° C. | A |
| Ex. 36 | | | UFX4002 | 20% | | | | | EMIMFSI | 80% | >200° C. | A |
| Ex. 37 | | | UFX4002 | 15% | AM-90G | 5% | | | EMIMFSI | 80% | >200° C. | A |
| Ex. 38 | | | UFX4002 | 15% | | | AA-6 | 5% | EMIMFSI | 80% | >200° C. | A |
| Ex. 39 | | | UV3000B | 15% | AM-90G | 5% | | | EMIMFSI | 80% | >200° C. | A |
| Ex. 40 | | | UV3000B | 15% | AM-130G | 5% | | | EMIMFSI | 80% | >200° C. | A |
| Ex. 41 | | | UV3000B | 15% | | | AA-6 | 5% | EMIMFSI | 80% | >200° C. | A |
| Ex. 42 | V3877 | 20% | | | | | | | EMIMBF4 | 80% | >200° C. | A |
| Ex. 43 | | | UFX4002 | 20% | | | | | EMIMBF4 | 80% | >200° C. | A |
| Ex. 44 | | | UFX4002 | 15% | AM-90G | 5% | | | EMIMBF4 | 80% | >200° C. | A |
| Ex. 45 | | | UFX4002 | 15% | | | AA-6 | 5% | EMIMBF4 | 80% | >200° C. | A |
| Ex. 46 | | | UV3000B | 15% | AM-90G | 5% | | | EMIMBF4 | 80% | >200° C. | A |
| Ex. 47 | | | UV3000B | 15% | AM-130G | 5% | | | EMIMBF4 | 80% | >200° C. | A |
| Ex. 48 | | | UV3000B | 15% | | | AA-6 | 5% | EMIMBF4 | 80% | >200° C. | A |
| Ex. 49 | V3877 | 20% | | | | | | | EMIMDCA | 80% | >200° C. | A |
| Ex. 50 | | | UFX4002 | 20% | | | | | EMIMDCA | 80% | >200° C. | A |
| Ex. 51 | | | UFX4002 | 15% | AM-90G | 5% | | | EMIMDCA | 80% | >200° C. | A |
| Ex. 52 | | | UFX4002 | 15% | | | AA-6 | 5% | EMIMDCA | 80% | >200° C. | A |

TABLE 2-2

| No. | Other polymerizable material Product name | Mass ratio | Urethane acrylate Product name | Mass ratio | PEO acrylate Product name | Mass ratio | PMMA acrylate Product name | Mass ratio | Electrolyte Product name | Mass ratio | Phase separation temperature of gel electrolyte | Exfoliation evaluation |
|---|---|---|---|---|---|---|---|---|---|---|---|---|
| Ex. 53 | | | UV3000B | 15% | AM-90G | 5% | | | EMIMDCA | 80% | >200° C. | A |
| Ex. 54 | | | UV3000B | 15% | AM-130G | 5% | | | EMIMDCA | 80% | >200° C. | A |
| Ex. 55 | | | UV3000B | 15% | | | AA-6 | 5% | EMIMDCA | 80% | >200° C. | A |
| Ex. 56 | V3877 | 20% | | | | | | | EMIMTFSI | 80% | >200° C. | A |
| Ex. 57 | | | UFX4002 | 20% | | | | | EMIMTFSI | 80% | >200° C. | A |
| Ex. 58 | | | UFX4002 | 15% | AM-90G | 5% | | | EMIMTFSI | 80% | >200° C. | A |
| Ex. 59 | | | UFX4002 | 15% | | | AA-6 | 5% | EMIMTFSI | 80% | >200° C. | A |
| Ex. 60 | | | UV3000B | 15% | AM-90G | 5% | | | EMIMTFSI | 80% | >200° C. | A |
| Ex. 61 | | | UV3000B | 15% | AM-130G | 5% | | | EMIMTFSI | 80% | >200° C. | A |
| Ex. 62 | | | UV3000B | 15% | | | AA-6 | 5% | EMIMTFSI | 80% | >200° C. | A |
| Ex. 63 | V3877 | 20% | | | | | | | EMIMFSI | 80% | >200° C. | A |
| Ex. 64 | | | UFX4002 | 20% | | | | | EMIMFSI | 80% | >200° C. | A |
| Ex. 65 | | | UFX4002 | 15% | AM-90G | 5% | | | EMIMFSI | 80% | >200° C. | A |
| Ex. 66 | | | UFX4002 | 15% | | | AA-6 | 5% | EMIMFSI | 80% | >200° C. | A |
| Ex. 67 | | | UV3000B | 15% | AM-90G | 5% | | | EMIMFSI | 80% | >200° C. | A |
| Ex. 68 | | | UV3000B | 15% | AM-130G | 5% | | | EMIMFSI | 80% | >200° C. | A |
| Ex. 69 | | | UV3000B | 15% | | | AA-6 | 5% | EMIMFSI | 80% | >200° C. | A |
| Ex. 70 | | | UV3200B | 50% | | | | | EMIMTCB | 50% | 160° C. | A |
| Ex. 71 | | | UXT6100 | 50% | | | | | EMIMTCB | 50% | 160° C. | A |
| Comp. Ex. 13 | | | | | A400 | 50% | | | EMIMTCB | 50% | 120° C. | B |

The softening point of the support (AD5503, obtained from TEIJIN LIMITED) was set to 145° C., and the temperature of a mold for thermoforming was set to 146° C.

The softening point of the support means a temperature at which a resin constituting the support starts to be deformed. The softening point of the support was determined in the following manner. Specifically, heat is applied to the support with a penetration probe using a TMA (thermomechanical analysis) device (obtained from KOBELCO Research Institute), and a displacement amount of the resin constituting the support was measured to determine the softening point.

Details of abbreviations in Table 2-1 and Table 2-2 are as follows.

—Electrolyte—
EMIMTCB (ethyl methylimidazolium tetracyanoborate, obtained from Merck)
EMIMTFSI (ethyl methylimidazolium bistrifluoromethane sulfonimide, obtained from KANTO CHEMICAL CO., INC.)

except that the polymerizable material used in the gel electrolyte layer was produced based on the formulations and the mass ratios described in Table 3; EMIMTFSI (ethyl methylimidazolium bistrifluoromethane sulfonimide, obtained from KANTO CHEMICAL CO., INC.) was used as the electrolyte used in the gel electrolyte layer; a resin described in Table 3 was used as the support; and thermoforming was performed at a molding temperature described in Table 3. As the photopolymerization initiator, 0.5% by mass of IRGACURE 184 (obtained from Nippon Kayaku Co., Ltd.) relative to a total amount of the acrylate or an amount of the other polymerizable material (V3877) was mixed therewith.

The produced electrochromic elements of Examples 72 to 92 were evaluated for the exfoliation and the phase separation temperature of the gel electrolyte layer in the same manner as in Example 1. Results are presented in Table 3.

TABLE 3

| No. | Other polymerizable material Product name | Mass ratio | Urethane acrylate Product name | Mass ratio | PEO acrylate Product name | Mass ratio | PMMA acrylate Product name | Mass ratio | Electrolyte Mass ratio | Phase separation temperature of gel electrolyte | Support Product name | Molding temp. | Exfoliation evaluation |
|---|---|---|---|---|---|---|---|---|---|---|---|---|---|
| Ex. 72 | V3877 | 20% | | | | | | | 80% | >200° C. | SP5570 | 140° C. | A |
| Ex. 73 | | | UXF4002 | 20% | | | | | 80% | >200° C. | SP5571 | 140° C. | A |
| Ex. 74 | | | UXF4002 | 15% | AM-90G | 5% | | | 80% | >200° C. | SP5572 | 140° C. | A |
| Ex. 75 | | | UXF4002 | 15% | | | AA-6 | 5% | 80% | >200° C. | SP5573 | 140° C. | A |
| Ex. 76 | | | UV3000B | 15% | AM-90G | 5% | | | 80% | >200° C. | SP5571 | 140° C. | A |
| Ex. 77 | | | UV3000B | 15% | AM-130G | 5% | | | 80% | >200° C. | SP5572 | 140° C. | A |
| Ex. 78 | | | UV3000B | 15% | | | AA-6 | 5% | 80% | >200° C. | SP5573 | 140° C. | A |
| Ex. 79 | V3877 | 20% | | | | | | | 80% | >200° C. | SH1126 | 120° C. | A |
| Ex. 80 | | | UXF4002 | 20% | | | | | 80% | >200° C. | SH1127 | 120° C. | A |
| Ex. 81 | | | UXF4002 | 15% | AM-90G | 5% | | | 80% | >200° C. | SH1128 | 120° C. | A |
| Ex. 82 | | | UXF4002 | 15% | | | AA-6 | 5% | 80% | >200° C. | SH1129 | 120° C. | A |
| Ex. 83 | | | UV3000B | 15% | AM-90G | 5% | | | 80% | >200° C. | SH1127 | 120° C. | A |
| Ex. 84 | | | UV3000B | 15% | AM-130G | 5% | | | 80% | >200° C. | SH1128 | 120° C. | A |
| Ex. 85 | | | UV3000B | 15% | | | AA-6 | 5% | 80% | >200° C. | SH1129 | 120° C. | A |
| Ex. 86 | V3877 | 20% | | | | | | | 80% | >200° C. | APL5013VH | 120° C. | A |
| Ex. 87 | | | UXF4002 | 20% | | | | | 80% | >200° C. | APL5014VH | 120° C. | A |
| Ex. 88 | | | UXF4002 | 15% | AM-90G | 5% | | | 80% | >200° C. | APL5015VH | 120° C. | A |
| Ex. 89 | | | UXF4002 | 15% | | | AA-6 | 5% | 80% | >200° C. | APL5016VH | 120° C. | A |
| Ex. 90 | | | UV3000B | 15% | AM-90G | 5% | | | 80% | >200° C. | APL5014VH | 120° C. | A |
| Ex. 91 | | | UV3000B | 15% | AM-130G | 5% | | | 80% | >200° C. | APL5015VH | 120° C. | A |
| Ex. 92 | | | UV3000B | 15% | | | AA-6 | 5% | 80% | >200° C. | APL5016VH | 120° C. | A |

EMIMFSI (1-ethyl-3-methylimidazolium bisfluorosulfonyl imide, obtained from KANTO CHEMICAL CO., INC.)
EMIMBF4 (1-ethyl-3-methylimidazolium tetrafluoroborate, obtained from Tokyo Chemical Industry Co., Ltd.)
EMIMDCA (1-ethyl-3-methylimidazolium dicyanamide, obtained from Tokyo Chemical Industry Co., Ltd.)
BMIMTFSI (1-butyl-3-methylimidazolium bistrifluoromethane sulfonyl imide, obtained from Tokyo Chemical Industry Co., Ltd.)
BMIMFSI (1-butyl-3-methylimidazolium bisfluorosulfonyl imide, obtained from KANTO CHEMICAL CO., INC.)

Examples 72 to 92

Electrochromic elements of Examples 72 to 92 were produced in the same manner as in Example 1 except that Details of abbreviations in Table 3 are as follows.
—Supports—
SP5570, SP5571, SP5572, and SP5573 (polycarbonate resin substrate, softening point: 142° C., obtained from TEIJIN LIMITED)
SH1126, SH1127, SH1128, and SH1129 (polycarbonate resin substrate, softening point: 131° C., obtained from TEIJIN LIMITED)
APL5013VH, APL5014VH, APL5015VH, and APL5016VH (cyclic olefin copolymer resin substrate, softening point: 129° C., obtained from Mitsubishi Chemical Corporation)

Aspects of the present disclosure are as follows, for example.
<1> An electrochromic element including:
a laminated body including a support formed of a resin, a first electrode layer, an electrochromic layer, and a second electrode layer, the support, the first electrode layer, the electrochromic layer, and the second electrode layer being disposed in the laminated body in this order; and
a gel electrolyte disposed between the first electrode layer and the second electrode layer,
wherein a phase separation temperature of the gel electrolyte is higher than a softening point of the support.
<2> The electrochromic element according to <1>,
wherein the laminated body further includes a deterioration preventing layer between the first electrode layer and the second electrode layer.
<3> The electrochromic element according to <1> or <2>,
wherein the gel electrolyte includes a binder resin, and the binder resin includes a urethane resin unit.
<4> The electrochromic element according to any one of <1> to <3>,
wherein the gel electrolyte includes a binder resin, and the binder resin includes at least one selected from the group consisting of a polyethylene oxide (PEO) chain and a polymethyl methacrylate (PMMA) chain.
<5> The electrochromic element according to any one of <1> to <4>,
wherein a solid content of the gel electrolyte is 50% by mass or less.
<6> The electrochromic element according to any one of <1> to <5>,
wherein the gel electrolyte includes an ionic liquid.
<7> The electrochromic element according to <6>,
wherein the gel electrolyte includes the ionic liquid in an amount of 50% by mass or more.
<8> The electrochromic element according to any one of <1> to <7>,
wherein the phase separation temperature of the gel electrolyte is 160° C. or higher.
<9> The electrochromic element according to any one of <1> to <8>,
wherein a difference between the phase separation temperature of the gel electrolyte and the softening point of the support is 10° C. or higher.
<10> The electrochromic element according to any one of <1> to <9>,
wherein the softening point of the support is 200° C. or lower.
<11> The electrochromic element according to any one of <1> to <10>,
wherein the support includes at least one selected from the group consisting of a polycarbonate resin, a polyethylene terephthalate resin, a polymethyl methacrylate resin, a urethane resin, a polyolefin resin, and a polyvinyl alcohol resin.
<12> The electrochromic element according to any one of <1> to <11>,
wherein the gel electrolyte is a layered gel electrolyte layer, and a thickness of the layered gel electrolyte layer is 30 μm or more but 150 μm or less.
<13> The electrochromic element according to any one of <1> to <12>,
wherein the laminated body includes an optical lens on at least one surface of the laminated body.
<14> The electrochromic element according to any one of <1> to <13>,
wherein the laminated body has a desired curved surface formed through thermoforming.
<15> A method for producing the electrochromic element according to any one of <1> to <14>, the method including:
subjecting the laminated body produced to thermoforming so as to have a desired curved surface shape; and
forming an optical lens on the laminated body.
<16> The method for producing the electrochromic element according to <15>,
wherein a heating temperature in the thermoforming is equal to or higher than the softening point of the support of the laminated body.
<17> An electrochromic light-adjusting element including
the electrochromic element according to any one of <1> to <14>.
<18> An electrochromic light-adjusting lens including:
the electrochromic light-adjusting element according to <17>.
<19> An electrochromic device including
the electrochromic element according to any one of <1> to <14> or the electrochromic light-adjusting element according to <17>.
<20> The electrochromic device according to <19>,
wherein the electrochromic device is light-adjusting spectacles, an active ND filter for a camera, binoculars, opera glasses, cycling goggles, a clock, a watch, electronic paper, an electronic album, an electronic decoration member, or an electronic advertisement board.

The electrochromic element according to any one of <1> to <14>, the method for producing an electrochromic element according to <15> or <16>, the electrochromic light-adjusting element according to <17>, the electrochromic light-adjusting lens according to <18>, and the electrochromic device according to <19> or <20> can solve the conventionally existing problems in the art and can achieve the object of the present disclosure.

What is claimed is:

1. An electrochromic element comprising:
a laminated body including a support formed of a resin, a first electrode layer, an electrochromic layer, and a second electrode layer, the support, the first electrode layer, the electrochromic layer, and the second electrode layer being disposed in the laminated body in this order; and
a gel electrolyte disposed between the first electrode layer and the second electrode layer,
wherein a phase separation temperature of the gel electrolyte is higher than a softening point of the support,
the support includes at least one selected from the group consisting of a polycarbonate resin, a polyethylene terephthalate resin, a polymethyl methacrylate resin, a urethane resin, a polyolefin resin, and a polyvinyl alcohol resin,
the phase separation temperature of the gel electrolyte is 160° C. or higher, and
wherein the gel electrolyte includes a binder resin, and the binder resin includes at least one selected from the group consisting of a urethane resin unit, a polyethylene oxide (PEO) chain and a polymethyl methacrylate (PMMA) chain.

2. The electrochromic element according to claim 1,
wherein the laminated body further includes a deterioration preventing layer between the first electrode layer and the second electrode layer.

3. The electrochromic element according to claim 1,
wherein a solid content of the gel electrolyte is 50% by mass or less.

4. The electrochromic element according to claim 1,
wherein the gel electrolyte includes an ionic liquid.

5. The electrochromic element according to claim 4,
wherein the gel electrolyte includes the ionic liquid in an amount of 50% by mass or more.

6. The electrochromic element according to claim 1, wherein a difference between the phase separation temperature of the gel electrolyte and the softening point of the support is 10° C. or higher.

7. The electrochromic element according to claim 1, wherein the softening point of the support is 200° C. or lower.

8. The electrochromic element according to claim 1, wherein the gel electrolyte is a layered gel electrolyte layer, and a thickness of the layered gel electrolyte layer is 30 μm or more but 150 μm or less.

9. The electrochromic element according to claim 1, wherein the laminated body includes an optical lens on at least one surface of the laminated body.

10. The electrochromic element according to claim 1, wherein the laminated body has a desired curved surface formed through thermoforming by using heating mold with a heating temperature between 100° C. and 160° C.

11. A method for producing the electrochromic element according to claim 1, the method comprising:
subjecting the laminated body produced to thermoforming so as to have a desired curved surface shape; and
forming an optical lens on the laminated body.

12. The method for producing the electrochromic element according to claim 11,
wherein a heating temperature in the thermoforming is equal to or higher than the softening point of the support of the laminated body.

13. An electrochromic light-adjusting element comprising the electrochromic element according to claim 1,
wherein the electrochromic light-adjusting element is an anti-glare mirror or a light-adjusting glass.

14. An electrochromic light-adjusting lens comprising:
the electrochromic light-adjusting element according to claim 13, and
an optical lens on one surface of the electrochromic element or embedding the electrochromic element.

15. An electrochromic device comprising
the electrochromic element according to claim 1, and
at least one of a power source, a fixing structure, or a controller.

16. The electrochromic device according to claim 15,
wherein the electrochromic device is light-adjusting spectacles, an active ND filter for a camera, binoculars, opera glasses, cycling goggles, a clock, a watch, electronic paper, an electronic album, an electronic decoration member, or an electronic advertisement board.

* * * * *